(12) United States Patent
Walker et al.

(10) Patent No.: US 11,970,045 B2
(45) Date of Patent: Apr. 30, 2024

(54) REFRIGERATION MODULE IN A VEHICLE MANAGEMENT SYSTEM

(71) Applicant: Rivian IP Holdings, LLC, Plymouth, MI (US)

(72) Inventors: Daniel Geoffrey Walker, Brackley (GB); Austin Keith Simpson, Huntington Beach, CA (US); William Thomas Wanstall, Huntington Beach, CA (US); Rachel Sarah Jewkes, Laguna Niguel, CA (US); Ruey-Khan Kenneth Tsang, Tustin, CA (US); Bar Sarig, Aliso Viejo, CA (US); Parmita Pradip Dalal, Dana Point, CA (US); Martyn Sweeney, Hemel Hempstead (GB); Aaron B. Weast, Trabuco Canyon, CA (US)

(73) Assignee: Rivian IP Holdings, LLC, Plymouth, MI (US)

( * ) Notice: Subject to any disclaimer, the term of this patent is extended or adjusted under 35 U.S.C. 154(b) by 0 days.

(21) Appl. No.: 17/885,355

(22) Filed: Aug. 10, 2022

(65) Prior Publication Data
US 2024/0051372 A1  Feb. 15, 2024

(51) Int. Cl.
*B60H 1/00* (2006.01)

(52) U.S. Cl.
CPC ....... *B60H 1/00878* (2013.01); *B60H 1/0065* (2013.01)

(58) Field of Classification Search
CPC .............. B60H 1/00878; B60H 1/0065; B60H 1/00507; B60H 1/00535
See application file for complete search history.

(56) References Cited

U.S. PATENT DOCUMENTS

| | | | | |
|---|---|---|---|---|
| 3,199,579 A | * | 8/1965 | Foster | A47J 39/006 62/448 |
| 2023/0356662 A1 | * | 11/2023 | Desai | B60R 5/041 |
| 2023/0373301 A1 | * | 11/2023 | Elder | G03B 21/58 |

\* cited by examiner

*Primary Examiner* — Marc E Norman
(74) *Attorney, Agent, or Firm* — HALEY GUILIANO LLP

(57) ABSTRACT

Disclosed are embodiments for providing temperature control for to a temperature-controlled storage compartment in a tunnel of a vehicle. The tunnel extends from a first side of the vehicle, such as the passenger side, to a second side of the vehicle, such as the driver side. The vehicle also includes a refrigeration module that is moveable on a shuttle of the tunnel. The refrigeration module includes a temperature-controlled storage unit configured to open and close in accordance with a path defined by an accessibility assembly. The shuttle transfers power from a power source, such as a battery, to the temperature-controlled storage unit, for example, to provide temperature control even when the vehicle is powered off. Accordingly, the refrigeration module provides a space-efficient system for ensuring prolonged temperature control of items stored in the temperature-controlled storage unit.

20 Claims, 19 Drawing Sheets

REFRIGERATION MODULE IN A VEHICLE MANAGEMENT SYSTEM

INTRODUCTION

A storage compartment of the vehicle may provide a convenient space for storing and transporting objects without compromising the comfort of a driver or passenger. For example, a truck bed or a car trunk may serve as dedicated space for storing luggage, groceries, outdoor equipment, a spare tire, and so forth, during transportation. However, car trunks and truck beds fail to provide adequate mechanisms for ensuring temperature control of stored items.

SUMMARY

Various aspects of the technology described herein are generally directed to systems, methods, and computer storage media for, among other things, a refrigeration module in a tunnel of a vehicle. The refrigeration module serves as a designated space in the vehicle to provide temperature control to a temperature-controlled storage unit. The refrigeration module may be positioned inside a tunnel of the vehicle. The tunnel may correspond to an opening extending between a first side of the vehicle and a second side of the vehicle. The refrigeration module may be movable on a shuttle of the tunnel. The shuttle may include a rail system to facilitate movement of the refrigeration module relative to the tunnel. For example, the refrigeration module may move out of (and into) the tunnel via the shuttle. In this manner, the disclosed refrigeration module provides a space-efficient system for ensuring temperature control of items stored in the temperature-controlled storage unit. Power (e.g., from a power source) used to provide temperature control may be separate from the power used to drive the vehicle, such that the temperature control is maintained even when the vehicle is powered off (e.g., not running).

In one embodiment, a system includes a tunnel that extends from a first side of a vehicle to a second side of the vehicle. The system further includes a refrigeration module movable on a shuttle of the tunnel, wherein the refrigeration module comprises a temperature-controlled storage unit configured to receive power from the shuttle.

In another embodiment, a refrigeration module for a vehicle includes a temperature-controlled storage unit that includes a power interface that receives power from a shuttle is movable in and out of a tunnel. The tunnel extends into the vehicle. The refrigeration module further includes a latching interface that locks the temperature-controlled storage unit to a fixed position on the shuttle. The temperature-controlled storage unit opens or closes to respectively provide or restrict access to a temperature-controlled storage compartment.

In yet another embodiment, a method includes causing a power source of a vehicle having a tunnel to provide power to a shuttle of the vehicle. The tunnel extends from a first side of the vehicle to a second side of the vehicle. Furthermore, the method includes causing the shuttle to transfer power to a temperature-controlled storage unit of a refrigerator module that is movable on the shuttle.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

The technology described herein is described in detail below with reference to the attached drawing figures, wherein.

DETAILED DESCRIPTION OF THE INVENTION

Figure 1:
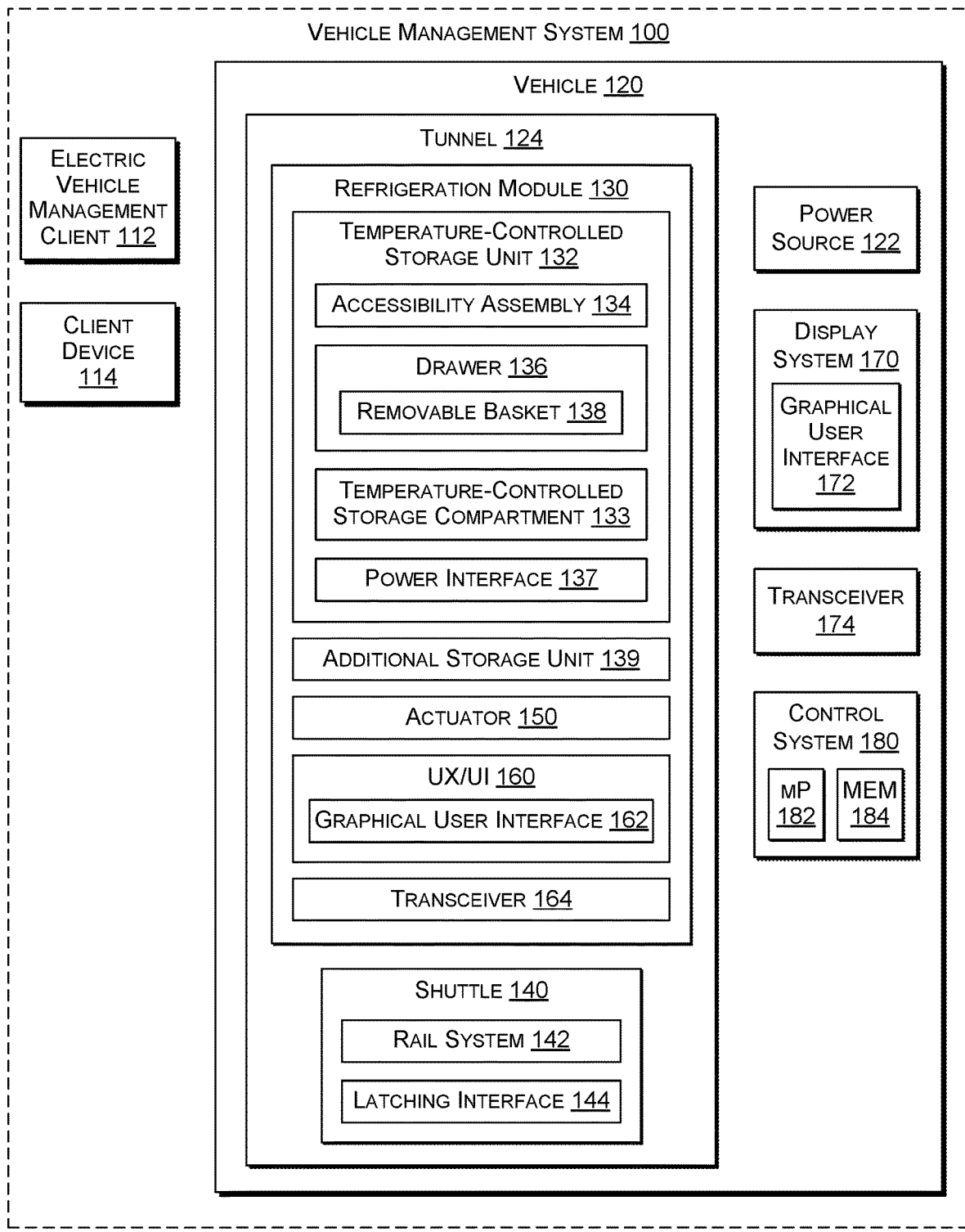
FIG. 1 is a block diagram of an exemplary schematic of a vehicle that includes a refrigeration module, in accordance with aspects of the technology described herein.

Vehicle drivers rely on vehicles to provide transportation. Additionally, vehicles of various sizes include storage spaces that facilitate storage of various items during transportation. In particular, the storage spaces may provide a convenient area for storing and transporting objects without compromising the comfort of a driver or passenger. For example, a car may include a storage space, such as a trunk; and a truck may include a storage space, such as a truck bed. These storage spaces may serve as dedicated regions for storing items without compromising the space or comfort of the driver and passengers. The storage compartment may transport any number of items, such as travel luggage, groceries (e.g., perishable and non-perishable food), tools, and a tire, to name a few.

In the context of providing thermally controlled transportation of items in vehicles, drivers are currently unable to achieve any convenient, prolonged thermal control of items. Vehicles are not configured with electromechanical infrastructure and/or control logic to support ensuring temperature control within a storage compartment. Although a driver may pack a cooler filled with ice, such an approach poses certain drawback. For example, the storage space for items is limited since the ice that provides cooling takes up a large amount of space. Moreover, the cooler filled with ice fails to provide long term cooling, since the cooling period is limited to the time that the ice remains frozen. A driver may find it difficult to access the cooler, since two hands are necessary to engage a zipper or VELCRO® strap of the cooler. Challenges with accessing the cooler and other vehicle movements can lead to spilled contents because the cooler is a separate component that is not secured to the vehicle.

Even if a driver may manually connect a refrigerator (e.g., a mini-fridge) to a battery of the vehicle, certain limitations exists for this approach as well. For example, the refrigerator does not adequately or efficiently utilize the vehicle space and may also suffer from unsecured positioning of the refrigerator and access issues discussed with reference to the cooler. A user may further be inconvenienced by having to load the refrigerator with perishables by bringing the refrigeration into the house or bringing groceries to the fridge, making the loading of items into the fridge an arduous process. In addition, the connected refrigerator may lack a vehicle-based mechanism for easily achieving a specific internal temperature. Accordingly, providing improvements to thermally controlled storage units for vehicles—the improvements which are difficult to achieve—can address the limitations described above. As such, a more comprehensive vehicle management system—with an alternative basis for ensuring prolonged cooling—can improve preservation of items transported by the vehicle in vehicle management systems.

With this in mind, various aspects of the technology described herein are generally directed to systems, methods, and computer storage media for, among other things, a refrigeration module in a tunnel of a vehicle. The tunnel may correspond to an opening that is positioned above a chassis of the vehicle. The tunnel may extend through the body of the vehicle from a first side (e.g., the passenger side), defined by a first lid, of the vehicle to a second side (e.g., driver side), defined by a lid, of the vehicle. More specifically, the tunnel may extend from the first side and the second side of the vehicle along a lateral axis that is substantially perpendicular to a direction of travel of the vehicle.

The refrigeration module may be movable on a shuttle of the tunnel. The shuttle may include a rail system to facilitate movement of the refrigeration module relative to the tunnel. For example, the refrigeration module may slide in and out of the tunnel along the shuttle (e.g., on a lateral axis). To that end, the refrigeration module may be expelled (e.g., automatically expelled) or pulled out (e.g., manually pulled out) of the tunnel of the vehicle (e.g., out of the first end of the tunnel). In the context of manual access, the refrigeration module may include a handle that may be pulled or pushed to extend (or push-in) the refrigeration module. In the context of automatic access, a control system may receive a user input to cause an actuator of the refrigeration module to eject (or retract) the refrigeration module.

By moving via a shuttle, the refrigeration module may transition between an "ejected state" and a "retracted state." As used herein, an "ejected state" of the refrigeration module may refer to a state of the refrigeration module in which the refrigeration module extends out of the tunnel of the vehicle after being automatically expelled or manually pulled out. As used herein, a "retracted state" of the refrigeration module may refer to a state of the refrigeration module in which the refrigeration module rests inside of the tunnel of the vehicle, for example, before being automatically expelled or manually pulled out.

The refrigeration module may accommodate a number of compartments. In particular, the refrigeration module may include a temperature-controlled storage unit and an additional storage unit. The temperature-controlled storage unit and/or an additional storage unit may be secured to the shuttle via a corresponding locking interface (e.g., locks, clips, and any suitable securing mechanism). The temperature-controlled storage compartment be manually (e.g., by a person) or automatically (e.g., by a control system) opened and closed. The temperature-controlled storage unit may receive, via a power interface, power from the shuttle (or a power source) to provide temperature control. The power interface may electrically connect the temperature-controlled storage unit to the shuttle or to the power source. The shuttle may include be electrically connected to a power source, such as a battery (e.g., 12-volt battery) of the vehicle, and the temperature-controlled storage unit. The shuttle can transfer power from the power source to the temperature-controlled storage unit. In this manner, the refrigeration module controls a temperature of the temperature-controlled storage unit based on the power transferred.

The temperature-controlled storage unit may include a drawer configured to open and close via an accessibility assembly to provide access to a temperature-controlled storage compartment when the refrigeration module has been expelled out of the tunnel. By moving via the accessibility assembly, the drawer may transition between an "open state" and a "closed state." As used herein, an "open state" of the drawer may refer to a state of the drawer in which the drawer has been opened to provide access to the inside the temperature-controlled storage unit of the refrigeration module. As used herein, a "closed state" of the drawer may refer to a drawer in which the drawer has been closed to restrict access to the inside the temperature-controlled storage unit of the refrigeration module. The drawers may pull out along the lateral axis or the longitudinal axis, the drawers may rotate about the longitudinal axis, and/or the drawers move in any suitable predefined path.

The temperature-controlled storage unit may be lined with a removable basket that may hold and/or separate the internal contents stored in the refrigeration module. To improve access to the items stored in the temperature-controlled storage unit, an accessibility assembly may define a travel path for a drawer—that opens and closes—to provide access to the items stored in the temperature-controlled storage unit. For example, the accessibility assembly may define a movement path (e.g., translation and rotation) for the drawer to provide improved accessibility to the stored items.

The control system of the refrigeration module manages different types of operations associated with the refrigeration module. The control system may receive, via a user device or user experience device (UI/UX) (e.g., knob, touch screen interface, and the like), a user input indicative of a target temperature. The control system may send a control signal to cause refrigeration components of the refrigeration module to cause the internal temperature of the drawer of the refrigeration module to change to the target temperature based on the user input. Moreover, the refrigeration module may be connected to a power source of the vehicle that may provide power to the refrigeration module even when the power is off. For example, the refrigeration module may be connected to the auxiliary battery, such as a 12-volt (V) battery, that The tunnel may include an outlet to which to refrigeration module may be connected to receive power from the power source.

In this manner, the disclosed refrigeration module provides a space-efficient system for ensuring prolonged temperature control of items stored in a temperature-controlled storage unit. The power (e.g., from the power source) used to provide temperature control may be separate from the power used to drive the vehicle, such that the temperature control may be maintained even when the vehicle is powered off (e.g., not running). Since the disclosed refrigeration module generally conforms to the shape of the tunnel, the items stored in the temperature-controlled storage unit of the refrigeration module may be secured and avoid spilling. Moreover, since the refrigeration module may be automatically ejected out of the tunnel (or manually pulled out of the tunnel) and since the drawer may be unlocked via a simple motion, the refrigeration module provides improved access to temperature-controlled stored items.

Aspects of the technical solution can be described by way of examples and with reference to FIGS. 1-19. FIG. 1 illustrates an vehicle management system 100 that includes an electric vehicle management client 112, a client device 114, and a vehicle 120. In one embodiment, the vehicle management system 100 may correspond to the electric vehicle system 1800 of FIG. 18. In an embodiment, the vehicle 120 includes a tunnel 124. The tunnel 124 may include a refrigeration module 130 that includes a temperature-controlled storage unit 132 including an accessibility assembly 134 and a drawer 136. The drawer 136 may provide access to a temperature-controlled storage compartment 133 of the temperature-controlled storage unit 132. As used herein, "temperature-controlled storage compartment 133" may refer to an enclosure formed inside the temperature-controlled storage unit 132, for example, when the temperature-controlled storage unit 132 is closed. To facilitate receiving power, the temperature-controlled storage unit 132 may include a power interface 137. The temperature-controlled storage unit 132 may receive power, via the power interface 137, from the power source 122 or from the shuttle 140 described herein. The temperature-controlled storage compartment 133 may be lined with a removable basket 138. Additionally, the tunnel 124 may house and enclose an additional storage 139, as discussed herein.

The tunnel 124 may also enclose a shuttle 140 that includes a rail system 142. The shuttle 140 may include a low friction mechanism or compressible mechanism that may slide and/or compress to transition the shuttle 140 to the ejected state. The temperature-controlled storage unit 132 may be removable from the shuttle 140. To facilitate coupling the temperature-controlled storage unit 132 to the shuttle 140, the shuttle 140 may include a latching interface that locks the temperature-controlled storage unit 132 to the shuttle 140. In one embodiment, the latching interface 144 includes a connector or mechanical latch that mates with a corresponding connector or mechanical latch on the temperature-controlled storage unit 132. In one embodiment, the temperature-controlled storage unit 132 is removable from the shuttle 140 in response to engaging the latching interface 144 on the shuttle 140 or in response to engaging the corresponding connector or mechanical latch on the temperature-controlled storage unit 132.

The refrigeration module 130 may include an actuator 150. The refrigeration module 130 may include a user experience or user interface (UX/UI) device 160 that may generate a graphical user interface 162. The refrigeration module 130 may include a transceiver 164 to communicate with the vehicle 120 by way a transceiver 174 of the vehicle 120. The vehicle 120 may include a display system 170 that may generate a graphical user interface 172. The vehicle 120 may include a control system 180 that includes a processor 182 and a memory device 184.

As used herein, "electric vehicle management client" 112 may refer to a personnel or user who engages with the vehicle 120 and/or the corresponding components of the vehicle 120. By way of non-limiting examples, the electric vehicle management client may include a driver of the vehicle 120, a passenger of the vehicle 120, a station manager of a charging station system, a service personnel, maintenance personnel, a robotic device that automates vehicle process, and any other person or computerized device that may interact with the vehicle 120. In an embodiment, the electric vehicle management client 112 manually engages the vehicle 120 to access the refrigeration module 130 via the tunnel 124, for example, for storing and retrieving items that have been or will be temperature controlled by the refrigeration module 130.

In one embodiment, the vehicle 120 corresponds to an electric vehicle, a hybrid vehicle, a vehicle powered by fuel, or any other object capable of transporting passengers and/or cargo. In the context of an electric vehicle, the vehicle 120 may be driven to a charging station, where the electric vehicle management client 112 may connect the vehicle to a charging station.

Although the vehicle 120 is discussed in the context of being operated by the electric vehicle management client 112, it should be understood that the embodiments described herein are not limited to manually operated vehicles. Indeed, the embodiments described herein may be employed for other vehicles, such as hybrid vehicles, autonomous vehicles, semi-autonomous vehicles, and other device capable of transporting cargo and passengers, such as trains, planes, and the like.

In an embodiment, the vehicle 120 includes a power source 122. The power source 122 may correspond to a battery. In one embodiment, the power source 122 corresponds to a low-voltage batter, such as a 12-V battery. In the context of an electric vehicle, the power source 122 may be separate from a high-voltage battery that provides driving power to the vehicle 120. The electric vehicle may include a vehicle converter to convert the high-voltage of the high voltage battery to the power source 122 and vice versa. The power source 122 may power the refrigeration module 130. Additionally, the power source 122 may provide power to other vehicle components, such as the windshield wipers, the radio, and/or other on-board devices, even when the vehicle is powered off.

The refrigeration module 130 may include a cord that may electrically couple to outlets on the shuttle 140 or outlets positioned in the tunnel 124. The shuttle 140 may be electrically connected to the power source 122, such as a battery (e.g., 12-V battery) of the vehicle, and the temperature-controlled storage unit 132. The shuttle 140 can transfer power from the power source 122 to the temperature-controlled storage unit 132. The control system 180 can send control signals to the power source 122 to control the temperature of the temperature-controlled storage unit 132. In this manner, the refrigeration module 130 can control a temperature of the inside of the temperature-controlled storage unit 132 (i.e., the temperature-controlled storage compartment 133) based on the power transferred. In one embodiment, the refrigeration module 130 includes a retractable cord (e.g., 12-V cord) that may plug-in or mate with a power outlet associated with the power source 122 (e.g., a power outlet positioned on the shuttle 140 or within the tunnel 124. In this manner, the refrigeration module 130 may supply power to the shuttle.

In one embodiment, the refrigeration module 130 includes a lever or switch that may be engaged to electrically connect or de-connect the refrigeration module 130 (or the temperature-controlled storage unit 132) to the power source 122. The lever may correspond to an electrical component that is engageable to connect or disconnect the conducting path in an electrical circuit between the refrigeration module 130 (or the temperature-controlled storage unit 132) and the power source 122. In this manner, the lever may interrupt the electrical current, or divert the current from one conductor to another. For example, the lever may include one or more movable electrical contacts connected to external circuits, such that when a pair of contacts are touching current can pass between the contacts, while current is unable to pass between a pair of contacts that are not touching. An example lever includes a toggle switch, a rotary switch, a mercury switch, a push-button switch, a reversing switch, and the like.

Figure 2:
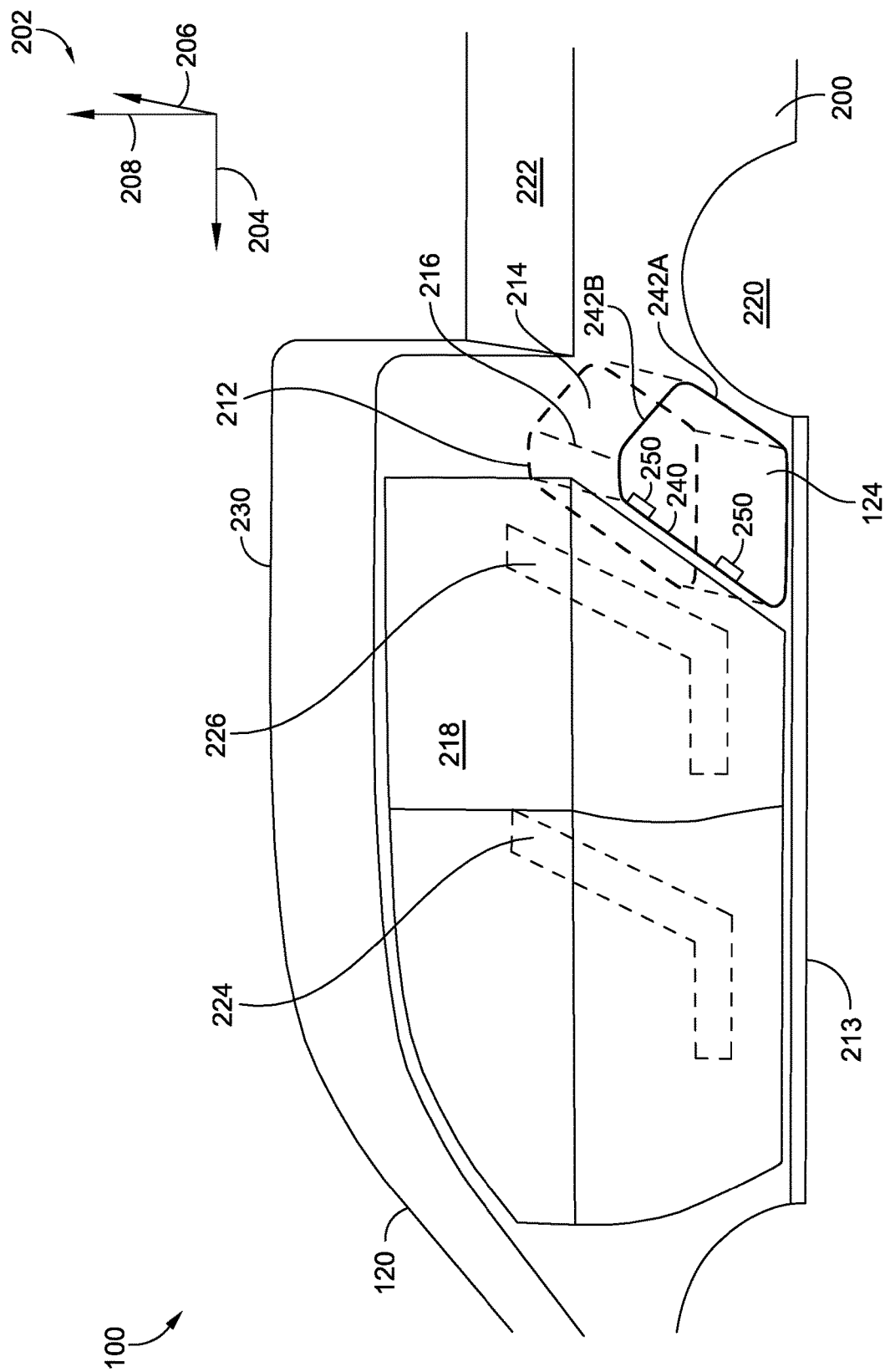
FIG. 2 is a schematic diagram of a left side view of a portion of a vehicle having a refrigeration module, in accordance with aspects of the technology described herein.

The tunnel 124 may extend between a first side (e.g., driver side) of the vehicle and a second side (e.g., passenger side) of the vehicle, for example, along the lateral length of vehicle 120, as illustrated in FIG. 2. The tunnel 124 may be defined as having a continuous cross sectional area between a first end of a first lateral side of the vehicle and a second end of a second lateral side of the vehicle 120. In one embodiment, the first end includes a first lid and the second end includes a second lid. The first and/or second lid may open and close by pivoting via a hinge about a pivot point, screwing out of the tunnel, or any other suitable closing and opening mechanism. The first lid may open and closing using a different mechanism that each other (e.g., pivot mechanism and screwing mechanism, respectively).

The refrigeration module 130 may conform to the shape defined by the tunnel 124. For example, the tunnel 124 may include any combination of straight sides, sharp edges, and/or curved regions. In one embodiment, the tunnel 124 is substantially oval or circular. In one embodiment, the tunnel 124 includes a quadrilateral-like lateral cross section, such as parallelogram-like, rectangular-like, or trapezoidal-like lateral cross section. For example, the tunnel 124 may include a parallelogram-like, rectangular-like, or trapezoidal-like lateral cross sectional area. In one embodiment, the tunnel 124 has a substantially flat upper side, such that the temperature-controlled storage unit 132 may have a substantially flat upper side, as show in FIGS. 4, 5, and 6. Alternatively, or additionally, the temperature-controlled storage unit 132 may include a flat section that can deploy (e.g., along the longitudinal axis 204 of FIGS. 2, 3, and 4) to provide additional table surface, as illustrated in FIG. 4. When deployed, the additional table surface may be positioned on the substantially flat upper side of the temperature-controlled storage unit 132, as illustrated in FIG. 4. In this manner, the upper side of the refrigeration module 130 may serve as a table that may hold any suitable item.

The temperature-controlled storage unit 132 may include side walls and corner regions that conform to the tunnel 124, such that a lateral cross sectional shape of the storage compartment substantially matches a lateral cross sectional shape of the tunnel 124. The vehicle 120 may include a shuttle 140 that defines a path out of the tunnel 124 and along the lateral axis. The shuttle 140 may be enclosed in the tunnel 124 when the refrigeration module 130 is in the retracted state. For example, the shuttle 140 may allow the refrigeration module 130 to transition between the ejected state and the retracted state. In one embodiment, the temperature-controlled storage unit 132 is removable from the shuttle 140. For example, the temperature-controlled storage unit 132 may mechanically interface with the shuttle 140 with quick connection latches that removably fix the temperature-controlled storage unit 132 to the shuttle 140. In this manner, the shuttle 140 may accommodate the temperature-controlled storage unit 132 or other modules that may be removable with respect to the shuttle.

In one embodiment, the shuttle 140 includes a rail system 142. The rail system 142 may include a rail and a roller assembly. The roller assembly of the rail system 142 may mate with the rail of the rail system 142 to facilitate movement of the temperature-controlled storage unit 132 in and out of the tunnel. In one embodiment, the rail system 142 includes a collapsible rail that collapses when the temperature-controlled storage unit 132 is slid into the tunnel 124 (e.g., to the retracted state) and that extends when the temperature-controlled storage unit 132 is expelled out of the tunnel 124 (e.g., to the ejected state). It should be understood that the shuttle 140 may include any suitable mechanism that facilitates movement of the temperature-controlled storage unit 132 relative to the tunnel 124, for example, along the lateral axis. In this manner, the refrigeration module 130 may more easily move relative to the tunnel 124, for example, between the ejected state and the retracted state.

When in the ejected state, the refrigeration module 130 may extend out of the tunnel 124. The accessibility assembly 134 may allow the drawer 136 to open to the opened state. When the drawer is in the open state, the items stored in the temperature-controlled storage unit 132 are accessible. In one embodiment, the accessibility assembly 134 defines a path for movement via rollers. The accessibility assembly 134 may include an indention that defines the path and that may receive and mate with corresponding rollers.

Figure 7A:
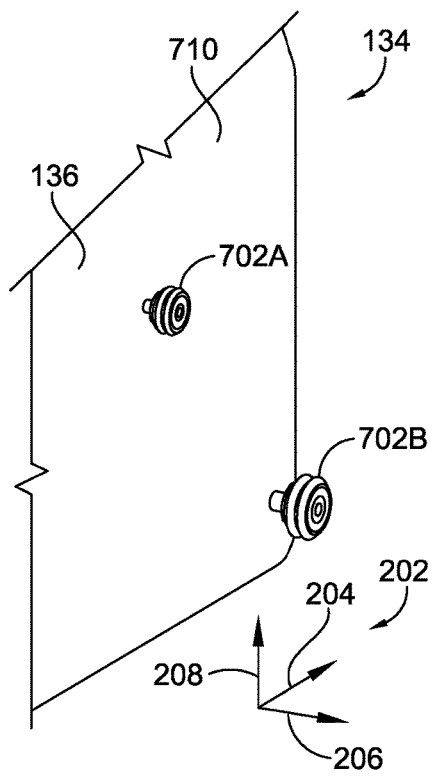
FIG. 7A is a schematic diagram of a first part of an accessibility assembly, in accordance with aspects of the technology described herein.
Figure 7B:
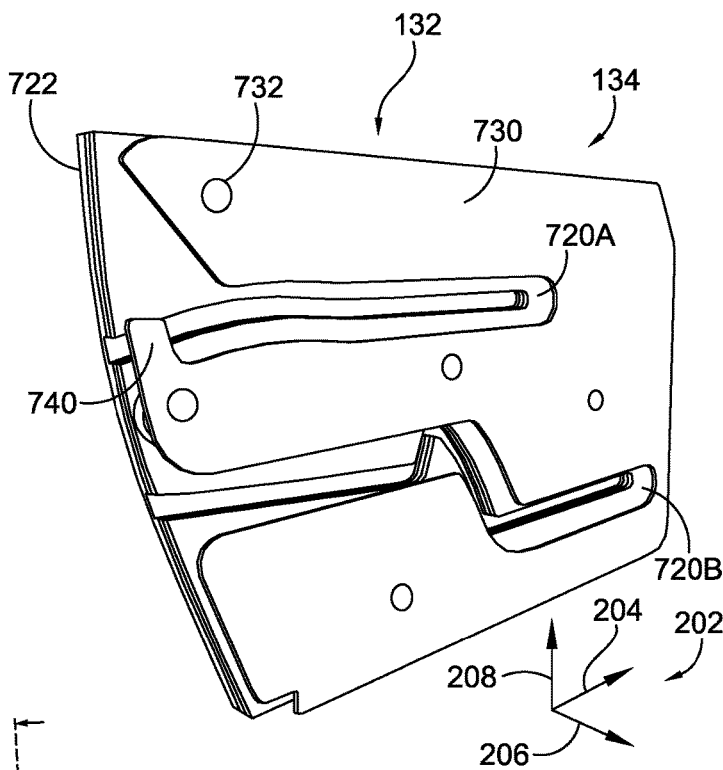
FIG. 7B is a first schematic diagram of a second part of the accessibility assembly of FIG. 7A, in accordance with aspects of the technology described herein.
Figure 7C:
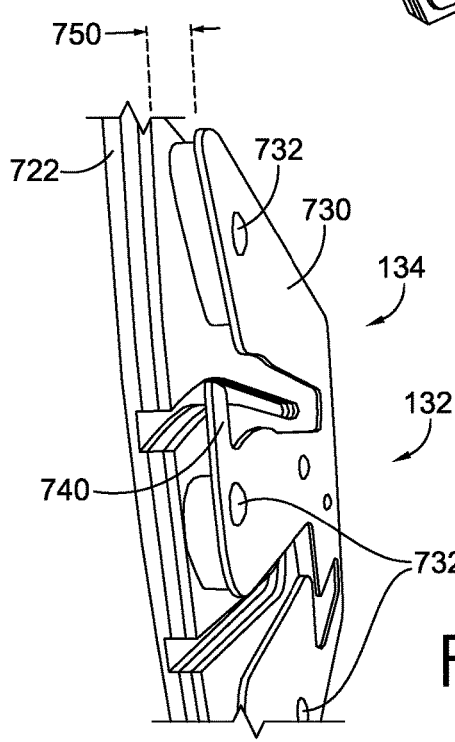
FIG. 7C is a second schematic diagram of the second part of FIG. 7B of the accessibility assembly of FIG. 7A, in accordance with aspects of the technology described herein.

As illustrated in FIGS. 7A, 7B, and 7C, the drawer 316 may open by rollers translating and rotating along two different path. The corners of the path may be rounded to allow a smooth path for transitioning between the opened state and closed state. In one embodiment, the drawer 136 may be pulled to be opened along the path defined by the accessibility assembly 134, and thereby allow access to the temperature-controlled storage compartment 133 (FIG. 1). The drawer 136 may include a handle, a knob, a string, a latch, a button, and the like that when engaged (e.g., pulled or pushed) opens or closes the drawer to provide access to the temperature-controlled storage compartment 133.

The temperature-controlled storage unit 132 may include a removable basket 138 that is positioned within the temperature-controlled storage compartment 133. The removable basket 138 may line the inside of the temperature-controlled storage unit 132 (e.g., may line the temperature-controlled storage compartment 133). In one embodiment, the removable basket 138 conforms to the shape of the inside of the temperature-controlled storage compartment 132. For example, the removable basket 138 may conform to the bottom side and the wall(s) of temperature-controlled storage compartment 133.

In one embodiment, the removable basket 138 may include dividers that extend upward from the bottom of the temperature-controlled storage compartment 133. The dividers may extend along the longitudinal axis along the entire length of the temperature-controlled storage compartment 133. In one embodiment, the divider may be adjustable to alter a size of the individual compartments formed by the divider. In this manner, the divider may define individual compartments within the temperature-controlled storage unit 132. In one embodiment, the divider slides along the lateral axis to adjust the size of the individual compartments defined by the dividers to facilitate accommodating items of different sizes.

The refrigeration module 130 may include an actuator 150, that when actuated, ejects or retracts the refrigeration module 130 between the ejected state and retracted state. In one embodiment, the control system 180 receives an input indicative of a request to control a position of the refrigeration module 130 to cause the actuator 150 to change a position of the refrigeration module 130 along the lateral axis (e.g., between the ejected state and retracted state). The actuator 150 may include an electric actuator, a hydraulic actuator, a pneumatic actuator (e.g., that includes pistons and fluid), hybrid actuators (e.g., pneumatics-mechanism actuators, electro-pneumatic actuators, or any suitable electromechanical device capable of automatically displacing the refrigeration module 130. Example actuators 150 include a linear actuator, a solenoid actuator, a rotary actuator, a diaphragm actuator, a piezoelectric actuator, magnetic levitation actuators, and the like.

Figure 13A:
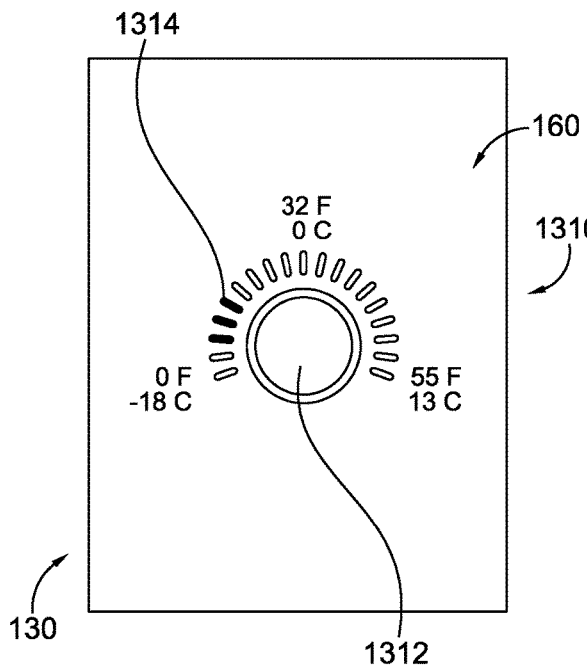
FIG. 13A is a schematic diagram of a user interface/user experience device (UX/UI) of the refrigeration module 130 that includes an adjustable knob system, in accordance with aspects of the technology described herein.
Figure 13B:
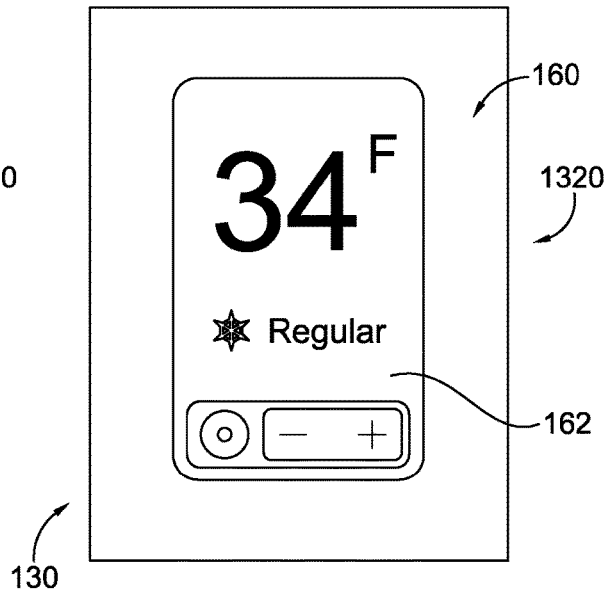
FIG. 13B is a schematic diagram of a UX/UI of the refrigeration module 130 that includes a touch screen display, in accordance with aspects of the technology described herein.

The refrigeration module 130 may include a UX/UI 160 that may receive a user input to modify a parameter of the refrigeration module 130. The UX/UI 160 may include a knob, a latch, a touch screen, a set of buttons, and/or any suitable device to receive a user input. In one embodiment, the UX/UI 160 receives a user input to change the internal temperature of the temperature-controlled storage unit 132. For example, the UX/UI may include a knob that can be turned to change the internal temperature, as illustrated in FIG. 13A. As another example, the UX/UI 160 may include the graphical user interface (GUI) 162. The GUI 162 may include a touch screen, as illustrated in FIG. 13B.

The display system 170 of the vehicle 120 may provide a visual indication of the status of the refrigeration module 130. In one embodiment, the control system 180 receives sensor data indicative of the parameters of the refrigeration module 130. Example parameters of the refrigeration module 130 include an internal temperature of the temperature-controlled storage unit 132, an indication of power provided to the refrigeration module 130 from the power source 122, a temperature external to the refrigeration module 130, a state of the refrigeration module (e.g., ejected state vs. closed state), a state of the drawer (e.g., opened state vs. closed state), or any suitable internal or external conditions relative to the refrigeration module 130.

The control system 180 may determine the parameters based on the sensor data, which may be communicated from a sensor assembly. The control system 180 may communicate the determined parameters for display to the display system 170. For example, the display system 170 may present an indication of whether the refrigeration module 130 is in the ejected state or the closed state. Alternatively or additionally, the display system 170 may display an indication of whether the refrigeration module is plugged-in to the power source 122, an indication of the internal temperature of the temperature-controlled storage unit 132, an indication of a time (e.g., countdown clock) until a target internal temperature is achieved, or any suitable information associated with the vehicle 120. In one embodiment, the display system 170 corresponds to a central display positioned inside the cab between the driver seat and front passenger seat.

The display system 170 may include a graphical user interface (GUI) 172 that may receive user inputs. The display system 170 may receive any suitable user input to interact with the GUI 172. In one embodiment, the GUI 172 includes a navigation panel for toggling between various features of the vehicle 120. For example, the navigation panel may include selectable icons for accessing the radio, the odometer, temperature control features, a global positioning system (GPS), navigation tools, the parameters of the refrigeration module 130, and/or any other features associated with the vehicle 120. In one embodiment, the display system 170 includes a touch screen that may receive touch-based user inputs. In this manner, a driver may engage with the display system 170 from inside the cab of the vehicle 120 to cause the control system 180 to execute the control logic described herein and/or send the control signals and/or control operations described herein.

The control system 180 may include a processor 182 and a memory device 184. A detailed discussion of the processor 182 may be found below with respect to the processor 1614 of FIG. 16, and a detailed discussion of the memory device 184 may be found below with respect to the memory 1612 of FIG. 16. In one embodiment, the control system 180 includes computer logic to control the internal temperature of the refrigeration module 130 or to control a position of the refrigeration module 130 (e.g., between the ejected state and retracted state). Additionally or alternatively, the control system 180 may include computer logic to cause the actuator 150 to actuate to control a position of the refrigeration module 130 relative to the tunnel 124, for example, to cause the refrigeration module 130 to transition between an ejected state and a retracted state. It should be understood that the control system 180 may include any additional or alternative control logic to facilitate efficient operations of the vehicle management system 100.

As illustrated, the vehicle 120 may include a transceiver 174 that allows communication with the refrigeration module 130. The refrigeration module 130 may include a corresponding transceiver, such as the illustrated transceiver 164, that allows communication with the vehicle 120. In one embodiment, the refrigeration module 130 and the vehicle 120 are communicatively coupled to each other by way of corresponding transceivers 164, 174. In one embodiment, the refrigeration module 130 and the vehicle 120 wirelessly communicate with each other by way of the corresponding transceivers 164, 174. The corresponding transceivers 164, 174 may include any suitable hardware (e.g., receivers, transmitters, and the like) configured to communicate over communication protocols, such as but not limited to Wireless Fidelity (WiFi), Bluetooth, Zigbe, Z-wave, 6LowPAN (IPv6 Low-power Wireless Personal Area Network), radio-frequency identification (RFID), cellular, 5G, 4G, LTE-M (Long Term Evolution Cat-M1), to name a few. In this manner, the electric vehicle management client 112 may engage with the display system 170 to cause the control system 180 to automatically communicate control signals to the refrigeration module 130.

FIG. 2 is a schematic diagram of a side view of a portion of a left side 200 of a vehicle 120 having a refrigeration module 130 (FIG. 1), in accordance with aspects of the technology described herein. The left side 200 may correspond to the driver's side of the vehicle 120 while the right side 230 may correspond to the passenger's side of the vehicle 120. However, in an embodiment, the left side 200 corresponds to the passenger side of the vehicle 120 while the right side 230 corresponds to the driver side of the vehicle 120. To facilitate discussion, the illustrated embodiment includes a coordinate system 202 having three orthogonal axis. The coordinate system 202 includes a longitudinal axis 204, a lateral axis 206, and a vertical axis 208. The longitudinal axis 204 may be oriented along a direction of travel of the vehicle 120. The lateral axis 206 (e.g., pointing into or out of the page) may be oriented along the direction the tunnel 124 extends. The vertical axis 208 may be oriented along the same direction as the gravity vector.

The vehicle 120 may include an tunnel 124 defining a storage compartment 212 having a volume to the exterior of vehicle 120. The tunnel 124 may be positioned along a vertical distance along the vertical axis 208 greater than that of a chassis 213 of the vehicle 120. In an embodiment, the tunnel 124 defines a storage compartment 212 having a profile shape (e.g., as viewed from the side of the vehicle) having sidewalls 214 and corner regions 216 generally corresponding to the shape of the tunnel 124 at the vehicle exterior (for example, behind the cabin 218 (e.g., passenger compartment) and in front of rear wheel well 220 and bed 222). As illustrated, the tunnel 124 may be arranged behind the cabin 218 (e.g., having seats 224 and 226, and a dashboard with vehicle controls) and above a chassis 213.

In an embodiment, the electric vehicle management client 112 (FIG. 1) opens a hatch or door at tunnel 124, and then pulls out the refrigeration module 130 from the left side 200 of vehicle 120 to access to items stored in the refrigeration module. In one embodiment, the storage compartment 212 may have a first opening on the left side 200 of the vehicle 120, and a second opening on a right side 230 of the vehicle.

The tunnel 124 may include one or more sidewalls, which may include a continuous wall that is entirely curved in cross section, a continuous wall that includes both curved portions and straight portions in cross section, and/or a continuous wall with straight and/or curved portions in cross section with defined edges between sidewalls. For example, the sidewall(s) may be composed of several pieces of panel material assembled together. In an embodiment, if the sidewall is composed of several pieces, the pieces may be connected together by welding, fasteners, glue, or using another mechanism for connecting components. The sidewalls may be made of plastic, metal alloy such as steel sheet or aluminum alloy sheet or the like, composite materials, or any other suitable material. In an embodiment, the tunnel 124 may be shaped with a cross section being of a substantially rectangular shape (e.g., a square shape).

In one embodiment, the tunnel 124 is shaped with a cross section in an asymmetric shape (e.g., a polygon shape with no right angles between one sidewall portion and an adjacent sidewall portion and with one sidewall that is longer in cross section than the rest of the sidewalls). For example, as illustrated, the front sidewall 240 may include a straight portion that is angled towards the back of the vehicle 120. The rear sidewall 242 may include two straight portions, where a lower straight portion 242A is angled towards the back of the vehicle 120 and the upper straight portion 242B is angled towards the front of the vehicle 120. In one embodiment, this asymmetric shape increases or maximizes the volume of the storage compartment 212 between the rear seat 226, rear wheel well 220, the chassis 213, and the bed 222 of the vehicle 120. For example, as illustrated, the bottom front portion of the storage compartment 212 may extend under the seatback of rear seat 226 and the rearmost portion of the storage compartment 212 extends above a portion of rear wheel well 220.

In one embodiment, the tunnel 124 includes one or more electric outputs 250. The one or more electric outputs 250 may serve as connecting points for powering any number of vehicle components from within the tunnel 124. For example, the tunnel 124 may include a first electric output 250 that supplies power from a first battery (e.g., a 120-V battery), and/or may include a second electric output 250 that supplies power from a second battery (e.g., a 12-V battery). In one embodiment, the refrigeration module 130 may include a retractable chord that may plug into the electric output 250. For example, the cord of the refrigeration module 130 may interface and connect to the electric output (e.g., 12-V port) to receive electric power.

Figure 3:
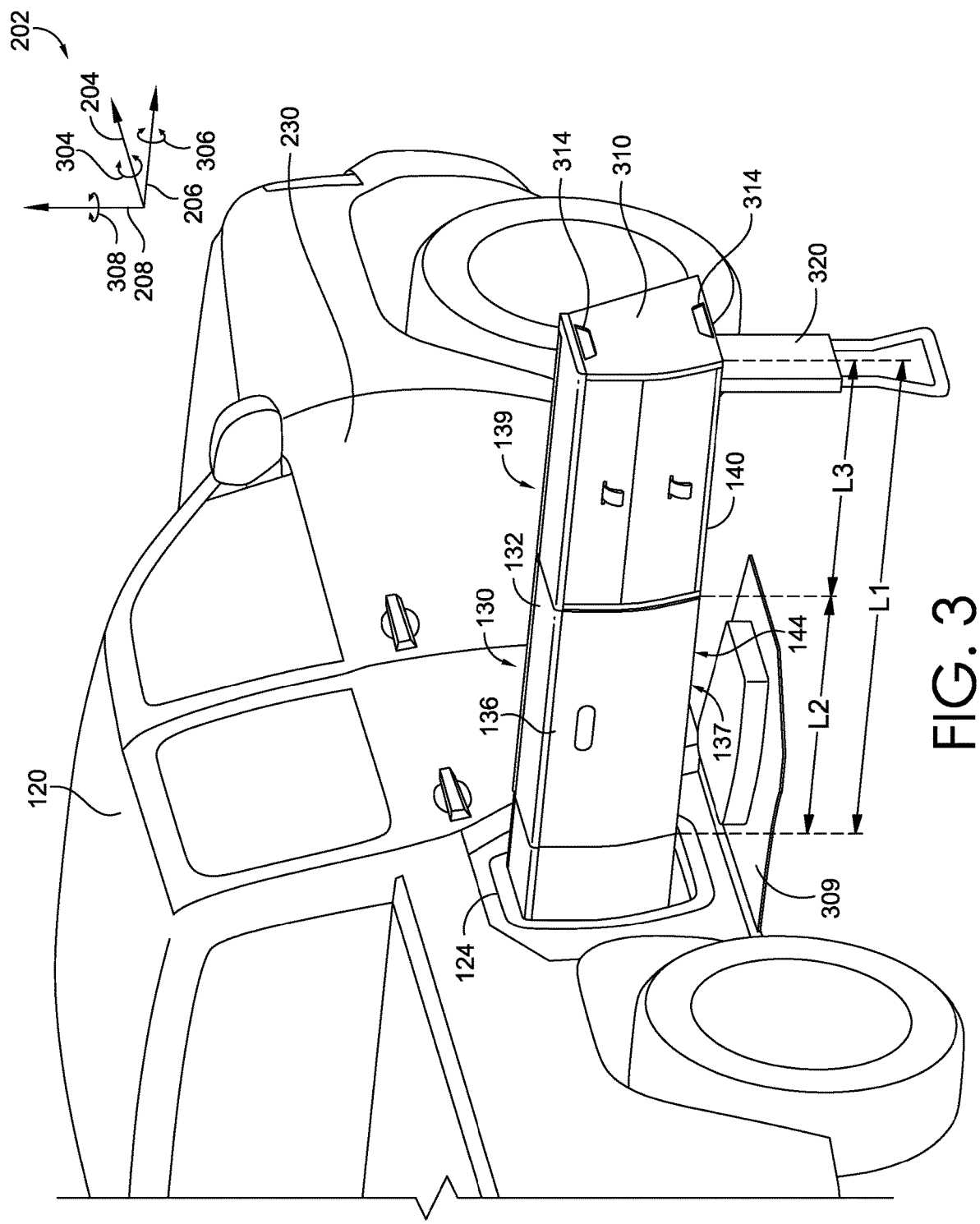
FIG. 3 is a schematic diagram of a right side view of a portion of a vehicle having the refrigeration module in an ejected state and a drawer in a closed state, in accordance with aspects of the technology described herein.
Figure 4:
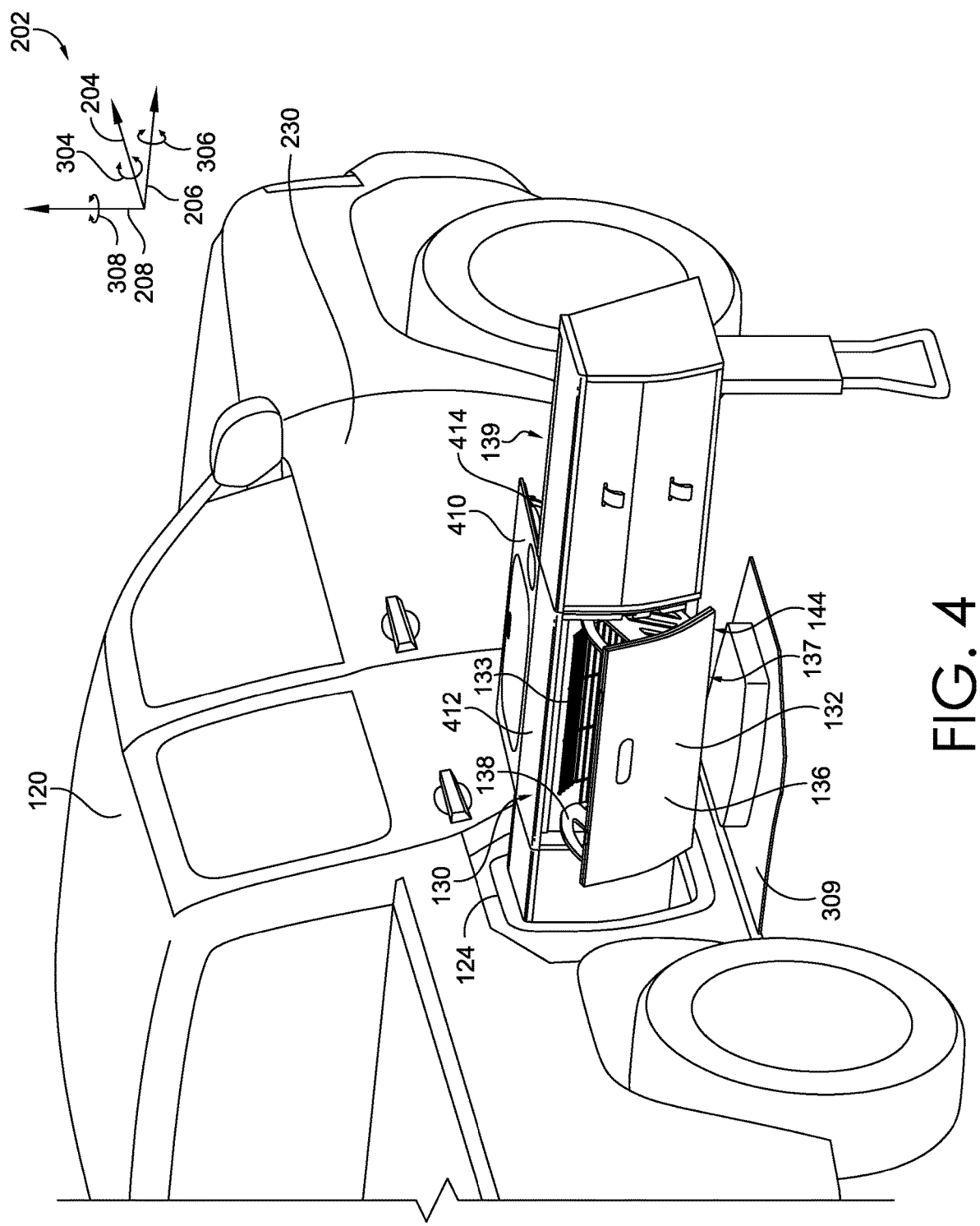
FIG. 4 is a schematic diagram of a right side view of a portion of a vehicle having the refrigeration module in an ejected state and a drawer in an open state, in accordance with aspects of the technology described herein.

Turning to FIG. 3, illustrated is a schematic diagram of a right side 230 of a vehicle 120 having the refrigeration module 130 in an ejected state and a drawer 136 in a closed state, in accordance with aspects of the technology described herein. To facilitate discussion, the coordinate system 202 has been reproduced, including the longitudinal axis 204, the lateral axis 206, and the vertical axis 208. Additionally, in the context of rotational motion, the coordinate system 202 defines a roll direction 304 as rotation about the longitudinal axis 204, a pitch direction 306 as rotation about the lateral axis 206, and yaw direction 308 as rotation about the vertical axis 208.

With reference to the coordinate system 202, the refrigeration module 130 may be automatically ejected (via actuation of the actuator 150 (FIG. 1) by the control system 180 (FIG. 1)) or manually pulled along the lateral axis 206 outward from the right side 230 of the vehicle 120. When the refrigeration module is in the ejected state, a lid 309 may pivot about the body of the vehicle 120 and rotate in roll direction 304 about the longitudinal axis 204. When closed, the lid 309 may form a portion of the side of the vehicle 120. The lid 309 may include a hinge that allows the lid 309 to open. The lid 309 may be engaged to open by pushing on the lid 309, pulling on the lid 309, or any automatic release mechanism (e.g., actuator configured to receive a control signal from the control system 180). In one embodiment, the lid 309 is substantially parallel to the ground when the lid 309 is opened and when the refrigeration module 130 is in the ejected state.

In the context of manual pulling, a distal end 310 of the refrigeration module 130 may include handle openings 314 that may receive a hand of the electric vehicle management client 112. In this manner, the distal end 310 may be manually pulled to bring the refrigeration module 130 to the illustrated ejected state. In one embodiment, the handle opening 314 may include a latch that may be engaged to remove a casing on the distal end 310 to provide access to the inside of the distal end 310 of the refrigeration module 130. As discussed above, the shuttle 140 may facilitate movement of the refrigeration module 130 along the lateral axis 206.

To facilitate balancing the refrigeration module 130 in the ejected state, the refrigeration module 130 may include a leg 320. In one embodiment, the leg 320 is positioned under the refrigeration module 130. The leg 320 may pivot about the underside of the refrigeration module 130 and rotate about the longitudinal axis 204 in roll direction 304. By rotating, the leg 320 may transition from being substantially parallel to the ground to being substantially perpendicular to the ground. In one embodiment, the leg 320 is positioned between tracks of the rail system 142 (FIG. 1) of the shuttle 140. In one embodiment, the leg 320 is of an adjustable length. For example, a first portion of the leg 320 may slide relative to a second portion of the leg 320 along a common axis. The leg 320 may include a locking mechanism to lock the position of the leg 320 relative to the refrigeration module 130. In this manner, the locking mechanism may lock the position of the leg 320, for example, when the leg 320 contacts the ground, thereby providing balance on different types of terrain and surfaces.

The refrigeration module 130 may include a temperature-controlled storage unit 132. Additionally, the refrigeration module 130 may include additional storage 139. The temperature-controlled storage unit 132 and/or the additional storage 139 may include the power interface 137 to receive power (via the power source 122 of FIG. 1 or directly from the shuttle 140) to achieve temperature control. Additionally, the latching interface 144 may fix the temperature-controlled storage unit 132 and/or the additional storage 139 to the shuttle 140. The length L1 of the refrigeration module 130 may substantially match the length of the vehicle 120 between the left side 200 (FIG. 2) and the right side 230 (e.g., the length between the passenger side and driver side). Alternatively, the length L1 may be slightly smaller than the length of the vehicle 120 between the left side 200 to provide clearance space, for example, for the lid 309. Additionally, the length L2 of the temperature-controlled storage unit 132 and the length L3 of the additional storage 139 may add to the length L1.

It should be understood that L2 may be substantially equal to L3; L2 may be greater or less than L3; or in the embodiments where the additional storage 139 is omitted, L1 may be substantially equal to L3. In one embodiment, the entirety of L1 may be temperature controlled. As discussed below, the additional storage 139 may include any number of compartments that may be accessible via respective drawers. In one embodiment, the additional storage 139 is not temperature controlled, whereas the temperature-controlled storage unit 132 is temperature controlled.

Turning to FIG. 4, illustrated is a schematic diagram of the second side 230 (e.g., passenger side) of a vehicle 120 having the refrigeration module 130 in an ejected state and a drawer 136 in an open state, in accordance with aspects of the technology described herein. Whereas the embodiment illustrated in FIG. 3 included the drawer 136 in a closed state having restricted access to the items stored in the temperature-controlled storage unit 132, the embodiment in FIG. 4 includes the drawer 136 in an opened state to allow access to items stored in the temperature-controlled storage unit 132. To transition between the open state and the closed state, the drawer 136 may translate along the longitudinal axis 204, the drawer may rotate in pitch direction 306 along the lateral axis 206, or the drawer 136 may traverse along any suitable path defined by the accessibility assembly 134, such as the path illustrated in FIG. 7B.

The refrigeration module 130 may include an additional table surface 410. The additional table surface 410 may also serve as a surface of the refrigeration module 130 while the refrigeration module 130 is in the retracted state inside the tunnel 124. For example, the additional table surface 410 may form the top surface 412 or the back surface 414 of the refrigeration module. As illustrated, the additional table surface 410 may rotate in pitch direction 306 along the edge of the top surface 412. The rotation of the additional table surface 410 causes the additional table surface 410 to transition from serving as the back surface 414 to being flush with the top surface 412 and parallel to the ground.

The additional table surface 410 may include one or more arms 420 that serve to provide a vertical force and stabilize the additional table surface relative to the refrigeration module 130. The additional surface 410 may include any number of features, such as indentions, groves, or panels, that may serve as a cup holder, a sink, a plate, a food tray, and so forth.

Figure 5:
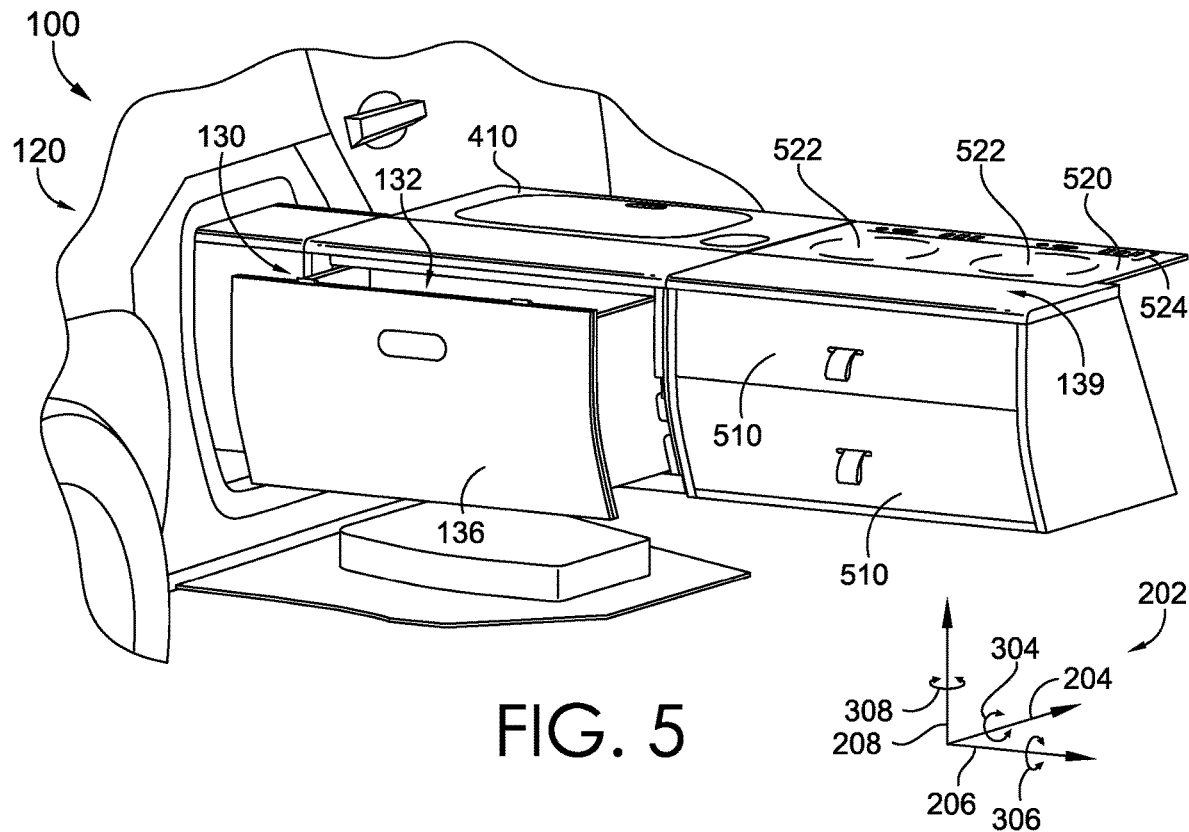
FIG. 5 is a schematic diagram of a vehicle having the refrigeration module in an ejected state and a drawer in an open state, in accordance with aspects of the technology described herein.
Figure 6:
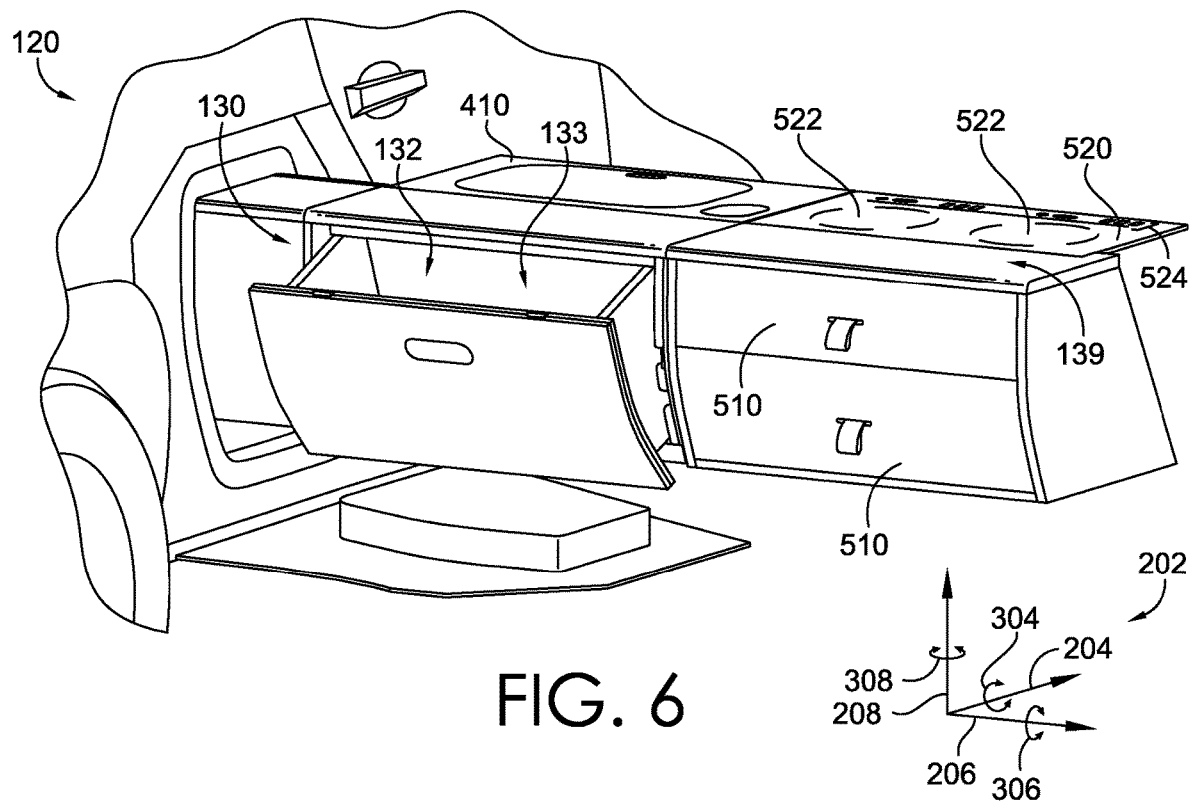
FIG. 6 is a schematic diagram of a vehicle having the refrigeration module in an ejected state and a drawer in an open state, in accordance with aspects of the technology described herein.

Turning to FIGS. 5 and 6, illustrated are respective schematic diagrams of a vehicle 120 having the refrigeration module 130 in an ejected state and a drawer 136 in an open state, in accordance with aspects of the technology described herein. To facilitate discussion, FIGS. 5 and 6 are described together. Whereas the embodiment illustrated in FIG. 5 includes a drawer 136 that translates (e.g., slides) via the accessibility assembly 134, along the longitudinal axis 204 to provide access to the temperature-controlled storage compartment 133; the embodiment illustrated in FIG. 6 includes a drawer 136 that rotates, via the accessibility assembly 134, in pitch direction 306 about the lateral axis 206 to provide access to the temperature-controlled storage compartment 133. It should be understood that the drawer 136 may transition between the opened state and the closed state via any suitable trajectory defined by an accessibility assembly 134, such as the accessibility assembly of FIGS. 7A, 7B, and 7C.

The refrigeration module 130 may include the additional storage 139. The additional storage 139 may include any number of storage drawers 510. The storage drawers 510 may or may not be temperature controlled. The storage drawers 510 may open using a similar or different accessibility assembly 134 than the drawer 136. Although the illustrated embodiment includes two storage drawers 510 that translate along the longitudinal axis 204, it should be understood that the additional storage 139 may include any number of storage drawers 510 that may open via any suitable mechanism.

In one embodiment, the refrigeration module 130 may accommodate any number of additional features, such as the additional storage 139, the additional table surface 410, and/or the kitchen attachment 520. The kitchen attachment 520 may include a heat surface 522, control inputs 524, and any other suitable features. In one embodiment, the features of the refrigeration module 130 are removable with respect to the shuttle 140 (FIG. 1). For example, the additional storage 139, the additional table surface 410, and/or the kitchen attachment 520 may each be removable from the shuttle 140.

Turning to FIGS. 7A, 7B, and 7C, illustrated is an accessibility assembly 134, in accordance with aspects of the technology described herein. In one embodiment, the accessibility assembly 134 includes a plurality of rollers 702. As illustrated in FIG. 7A, two rollers 702 may be positioned on the inner side of a side wall 710 of the drawer 136. The side wall 710 of the drawer 136 may be parallel to the longitudinal axis 204. For example, the drawer 136 may include two side walls 710 that form the side walls of the temperature-controlled storage compartment 133 (FIG. 1) when the rollers engage with the roller paths 720 of FIG. 7B. In one embodiment, each of the two side walls 710 include the rollers 702. The rollers 702 may include any suitable rollers, such as but not limited to, v-groove rollers, ball bearing rollers, and the like.

The accessibility assembly 134 may include respective roller paths 720. The respective roller paths 720 may define a travel path for one or more rollers 702. For example, as illustrated in FIG. 7B, the accessibility assembly 134 may include two roller paths 720A, 720B. The two roller paths 720A, 720B may be positioned on a side wall 722 of the temperature-controlled storage compartment 133. In one embodiment, an elevated sheet 730 is coupled to the inner side wall 722 of the temperature-controlled storage unit 132. For example, one or more pins 732 may mechanically fix the elevated sheet 730 to the side wall 722.

The elevated sheet 730 may include a roller path 720 corresponding to one or more respective rollers 702. As illustrated, in one embodiment, the first roller path 720A may correspond to the first roller 702A, and the second roller path 720B may correspond to the second roller 702B. For example, the first roller 702A may roll along the first roller path 720A, and the second roller 702B may roll along the second roller path 720B.

In one embodiment, the first roller path 720A defines a substantially straight line having a lip portion 740 at the inlet. The lip portion 740 may include a substantially vertically extending member, as illustrated, that prevents the drawer from falling out of the temperature-controlled storage unit 132. The drawer 136 may be removable from the temperature-controlled storage unit 132, for example, by decoupling the rollers 702 from the roller paths 720. For example, the drawer 136 may be removed from the temperature-controlled storage unit 132 by pulling the drawer until the roller 702A contacts the lip portion 740, and then lifting or vertically displacing the drawer 136. In one embodiment, the second roller path 720B defines a "z-shaped" trajectory. The "z-shaped" trajectory of the second roller path 720B may have rounded edges to reduce racking and improve motion. By engaging with the roller paths 720A, 720B, the rollers 702 may cause the drawer 136 to transition between the opened state and the closed state. In one embodiment, by engaging with the roller paths 720A, 720B, the rollers 702 may cause the drawer 136 to transition to the opened state illustrated in FIG. 6. The roller paths 720 to open defined by the illustrated accessibility assembly 134 may provide an increase opened surface area to more easily store larger items in the temperature-controlled storage unit 132.

As illustrated in FIG. 7C, the elevated sheet 730 may be offset from the side wall 722 of the temperature-controlled storage unit 132 by a distance 750. The distance 750 may be large enough to accommodate a width of the rollers 702. In one embodiment, the distance 750 is larger than the width of the rollers 702 to account for engineering-specific tolerance (s). Although FIG. 7 is discussed in the context of an accessibility assembly 134 of rollers traveling along a predefined paths, it should be understood that any alternative accessibility assemblies 134 may be employed to facilitate the drawer transitioning between the open state and the closed state.

Figure 8:
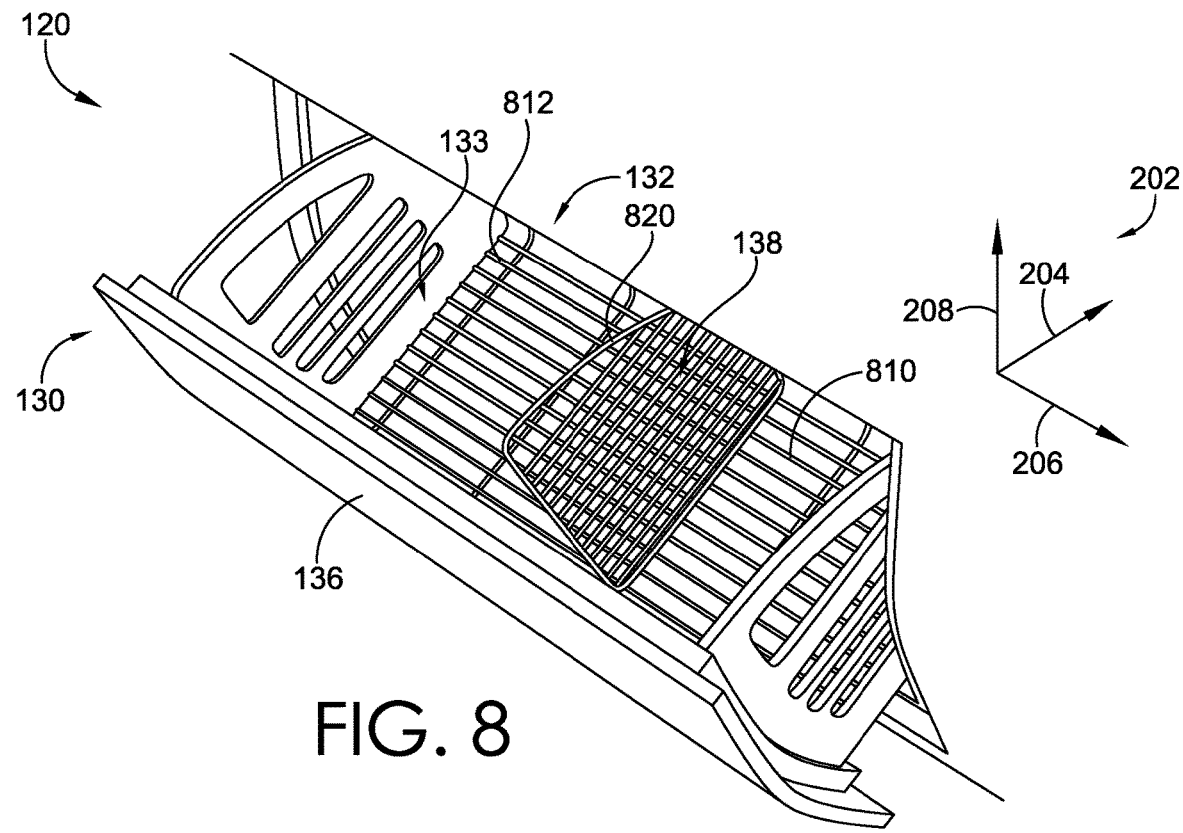
FIG. 8 is a schematic diagram of a vehicle having the refrigeration module in an ejected state and a drawer in an open state, in accordance with aspects of the technology described herein.

Turning to FIG. 8, illustrated is a schematic diagram of a vehicle 120 having the refrigeration module 130 in an ejected state and a drawer 136 in an open state, in accordance with aspects of the technology described herein. In one embodiment, the drawer 136 may include a removable basket 138 having linear members 810 forming base 812 on which items may sit during storage within the temperature-controlled storage unit 132. Although the linear members 810 are illustrated as extending along the lateral axis 206, it should be understood that the linear members 810 may extend in any alternative direction (e.g., along the longitudinal axis 204).

To facilitate separating items stored within the temperature-controlled storage unit 132, the removable basket 138 may include a divider 820. For example, as illustrated, the divider 820 may divide the temperature-controlled storage compartment 133 into two sub-compartments. In one embodiment, the divider 820 translates along the lateral axis 206 to adjust the size of the sub-compartments of the temperature-controlled storage compartment 133 formed by the divider 820. Although the illustrated embodiment includes one divider 820, it should be understood that the basket 138 may include any additional dividers 820 or the divider may be omitted.

Figure 9A:
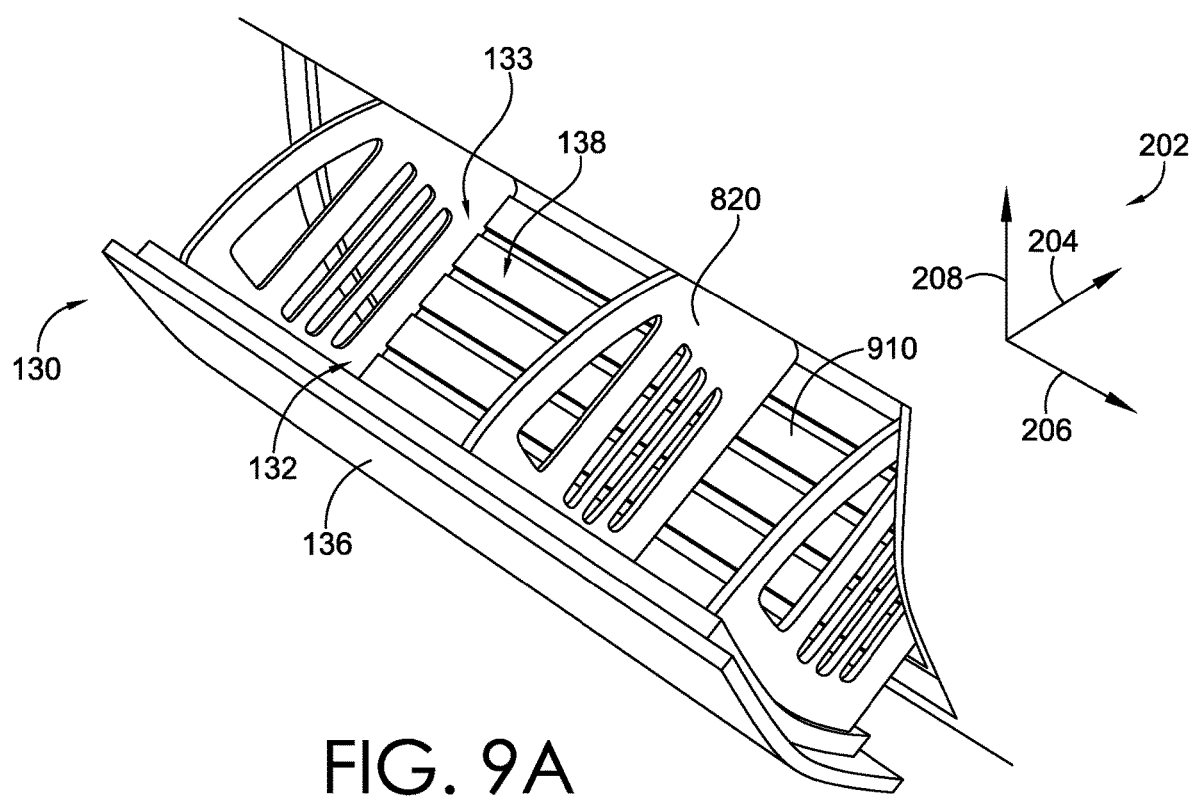
FIG. 9A is a schematic diagram of refrigeration module having a drawer in an open state, in accordance with aspects of the technology described herein.
Figure 9B:
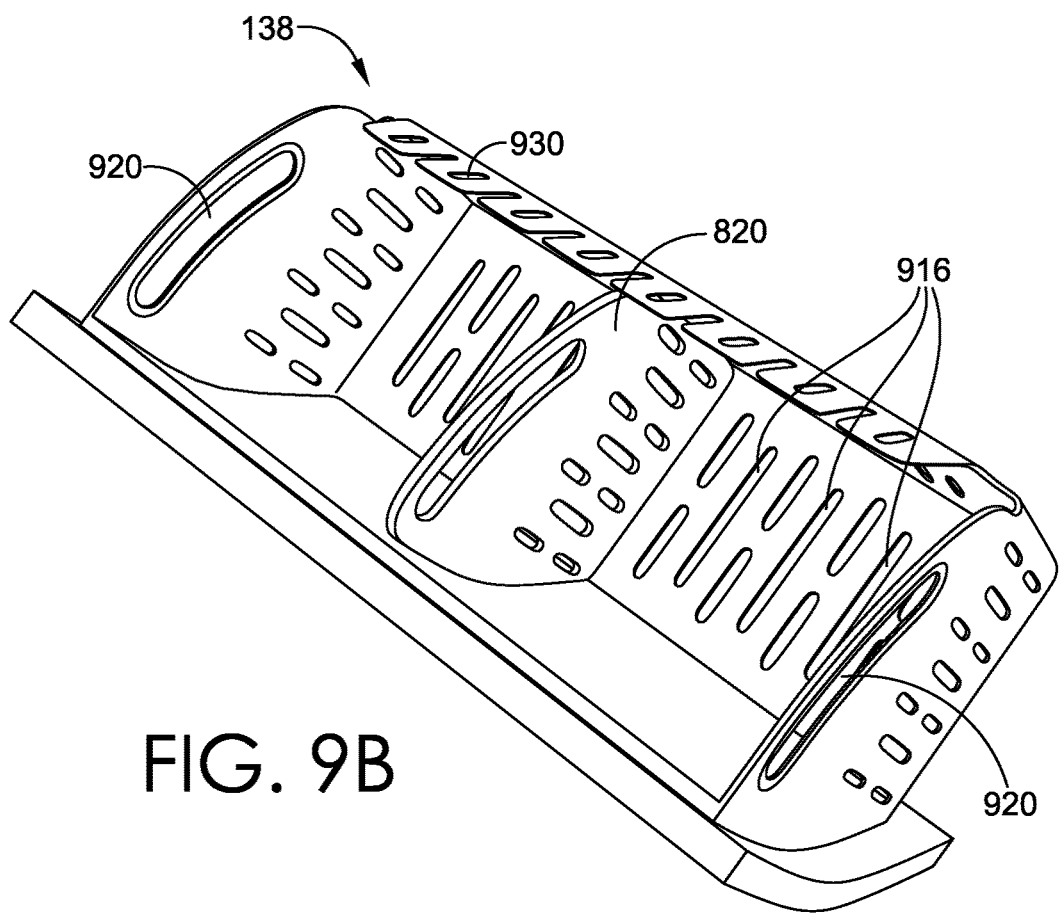
FIG. 9B is a schematic diagram of a removable basket of a drawer, in accordance with aspects of the technology described herein.
Figure 9C:
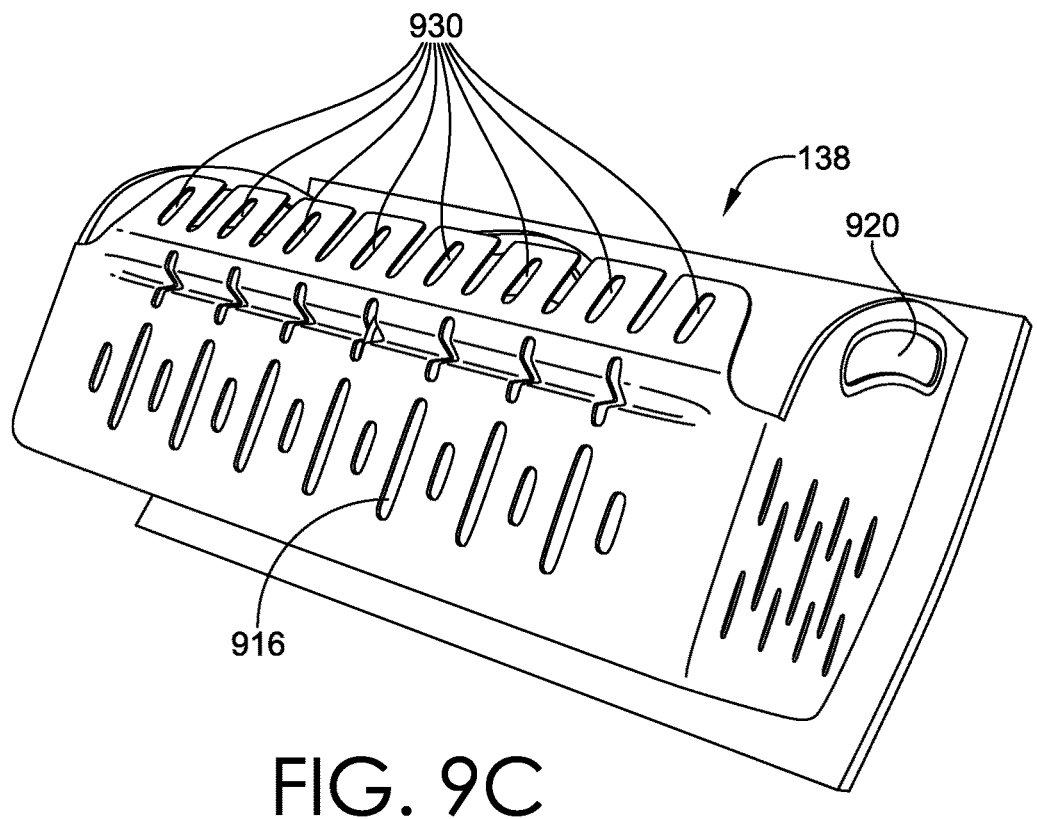
FIG. 9C is a schematic diagram of a removable basket of a drawer, in accordance with aspects of the technology described herein.

FIGS. 9A, 9B, and 9C include schematic diagrams of a refrigeration module 130 having a drawer 136 in an open state, such that the drawer 136 includes a removable basket 138, in accordance with aspects of the technology described herein. As compared to the embodiment in FIG. 8, the basket 138 of FIG. 9A includes linear members 910 that are more wide. The basket 138 may include a divider 820 that may translate along the lateral axis 206 to change the size of the sub-compartments formed by the divider 820 inside of the temperature-controlled storage unit 132.

Turning to FIGS. 9B and 9C, illustrated is a schematic diagram a removable basket 138, in accordance with aspects of the technology described herein. Instead of having linear members 810 or 910, the removable basket 138 includes openings 916 that allow for airflow during cooling of the temperature-controlled storage unit 132. In one embodiment the removable basket 138 includes a handle opening 920 to facilitate manual manipulation of the removable basket 138. For example, in implementation, a user may remove the removable basket 138 from the temperature-controlled storage unit 132 (e.g., to clean the removable basket 138, to load up the removable basket 138, and the like) by holding on the handle openings 920 and removing the removable basket 138 from the temperature-controlled storage unit 132 while the drawer is in the open state.

In one embodiment, the openings 916 is equal in size to the divider 820, such that the divider 820 may mate with the opening 916. In this manner, the openings 916 may correspond to discreet points along the lateral axis 206 along which the divider 820 may be placed. To further facilitate fixing the divider 820, the basket 138 may include lips 930 between which the divider 820 may be positioned.

Figure 10:
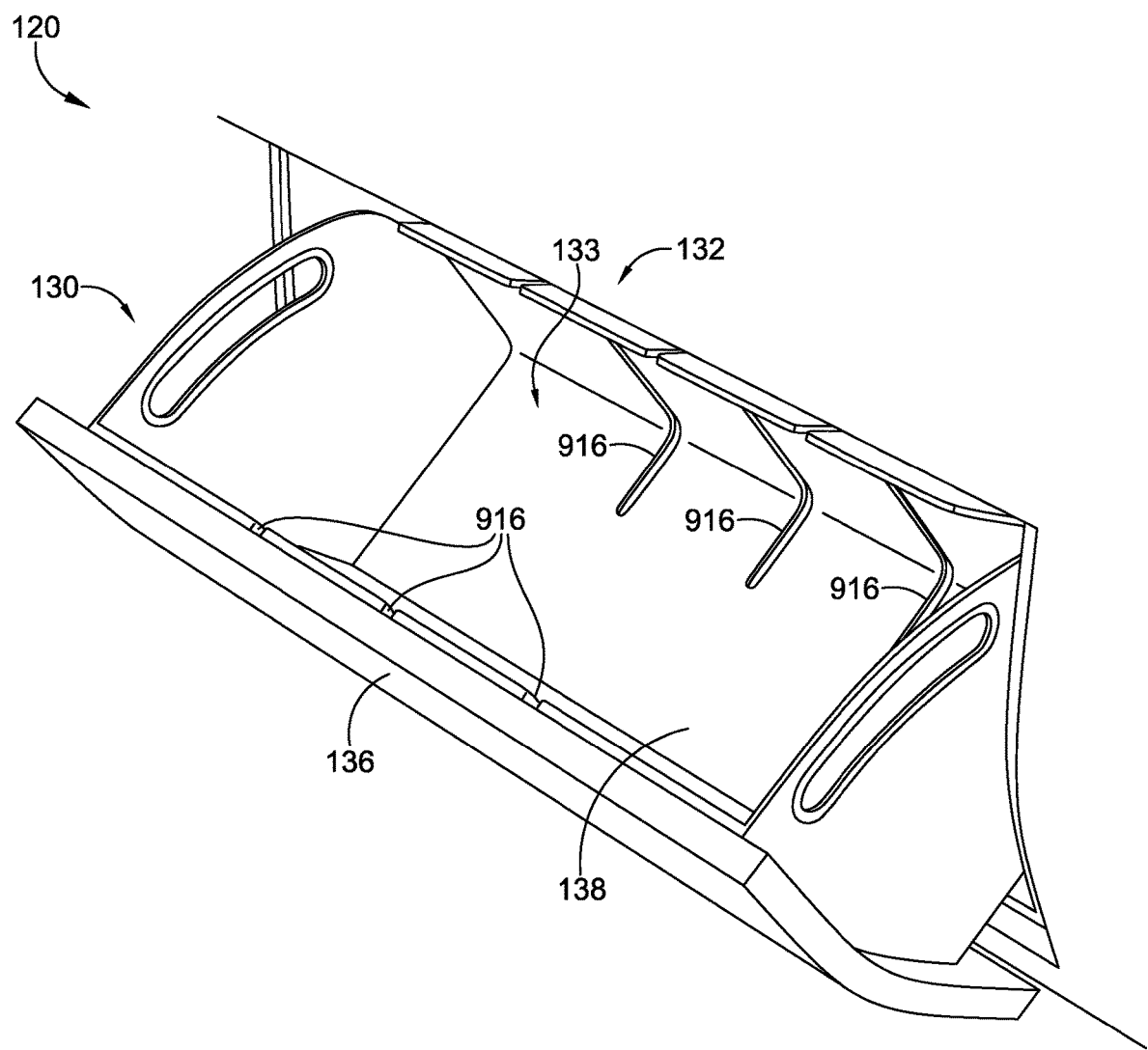
FIG. 10 is a schematic diagram of a drawer in an open state, in accordance with aspects of the technology described herein.

Turning to FIG. 10, illustrated is a schematic diagram of a drawer 136 in an open state, in accordance with aspects of the technology described herein. In one embodiment, the basket 138 may include openings 916 that may receive a respective divider 820 (FIGS. 8-9). The openings may extend between two surfaces forming the basket 138. As illustrated, the openings 916 may extend between a back surface and a bottom surface of the basket 138. Additionally, the basket 138 may include openings 916 that extend between the front surface and the bottom surface. The openings 916 on the front surface and back surface may align with each other. In one embodiment, the basket 138 is integral to the temperature-controlled storage unit 132, such that the basket is fixed to the inside of the temperature-controlled storage unit 132. The basket 138 may be made of any suitable material, such as plastic, metal, marble, ceramic, and so forth.

Figure 11:
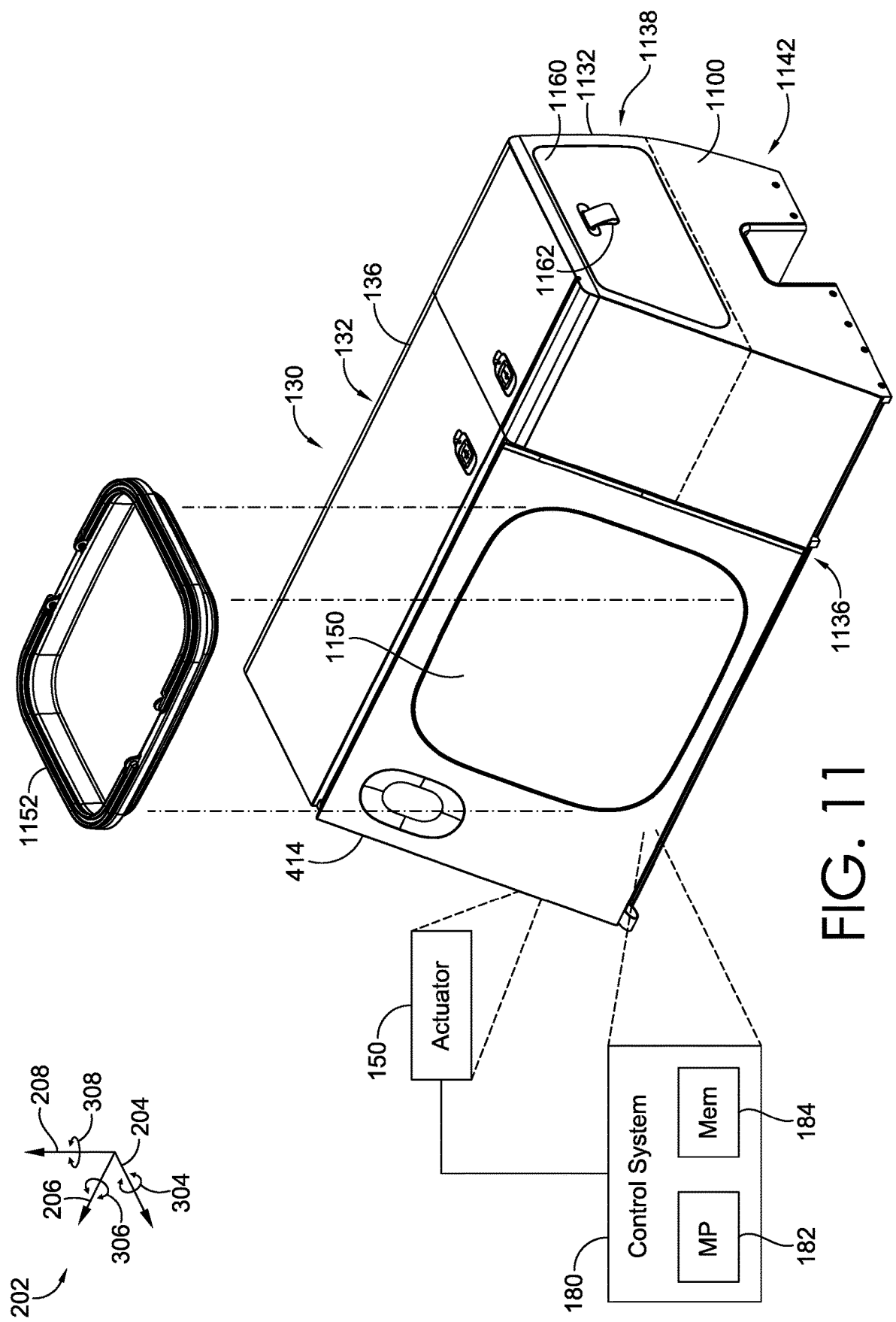
FIG. 11 is a schematic diagram of a left side of the refrigeration module having a drawer in a closed state, in accordance with aspects of the technology described herein.

FIG. 11 is a schematic diagram of a left side 1100 of the refrigeration module 130 having a drawer 136 in a closed state, in accordance with aspects of the technology described herein. As discussed above, when the drawer is in a closed state, a closed and sealed temperature-controlled container (e.g., the temperature-controlled storage compartment 133) is formed by the temperature-controlled storage unit 132. The refrigeration module may include a second temperature-controlled storage unit 1132. The second temperature-controlled storage unit 1132 may be fixed and collinear along the lateral axis 206 with respect to the temperature-controlled storage unit 132. In this manner, the second temperature-controlled storage unit 1132 moves with the temperature-controlled storage unit 132 during the refrigeration module transitioning between the ejected state and retracted state.

Figure 12A:
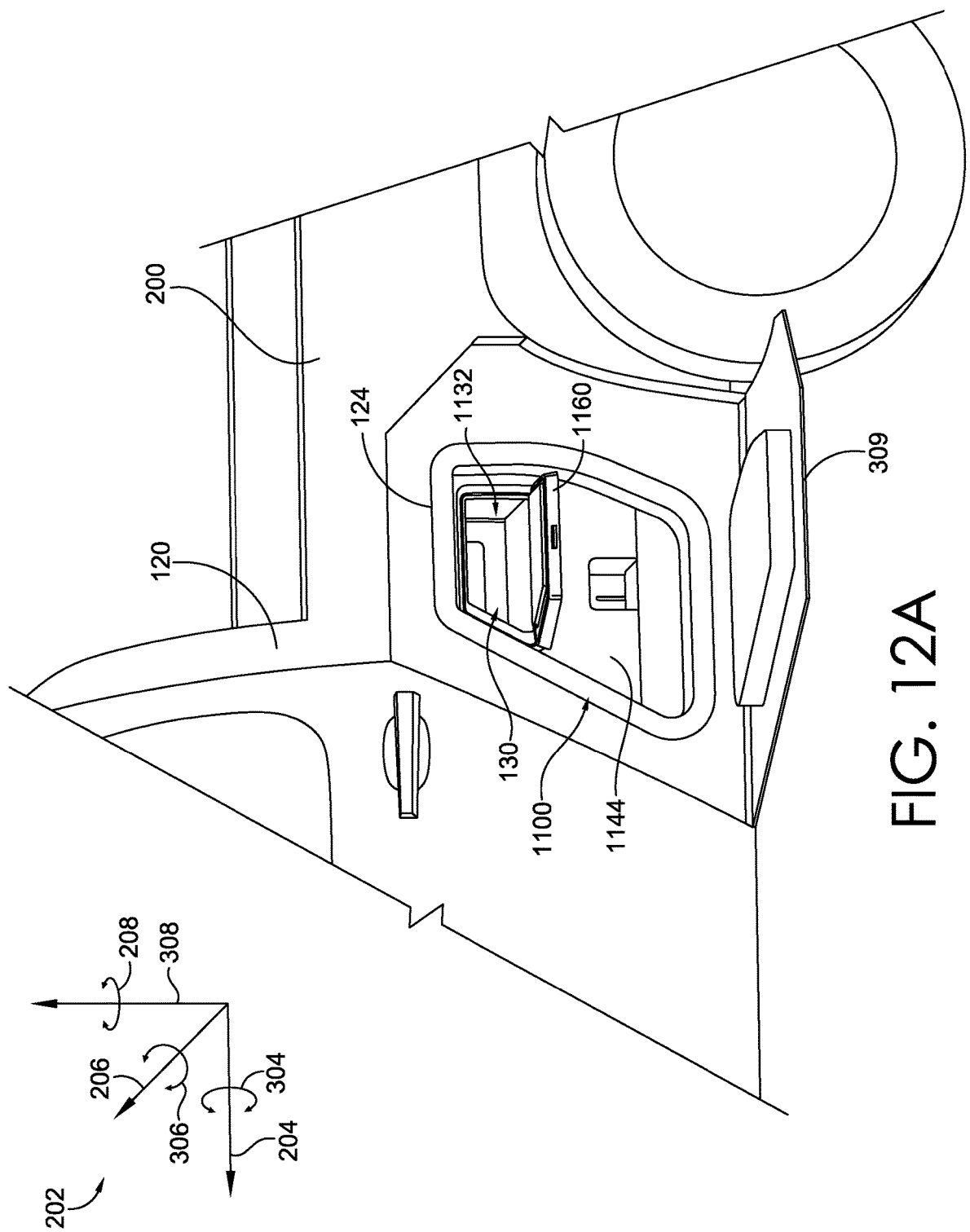
FIG. 12A is a schematic diagram of a left side of the refrigeration module having a second temperature-controlled storage unit that has been opened, in accordance with aspects of the technology described herein.
Figure 12B:
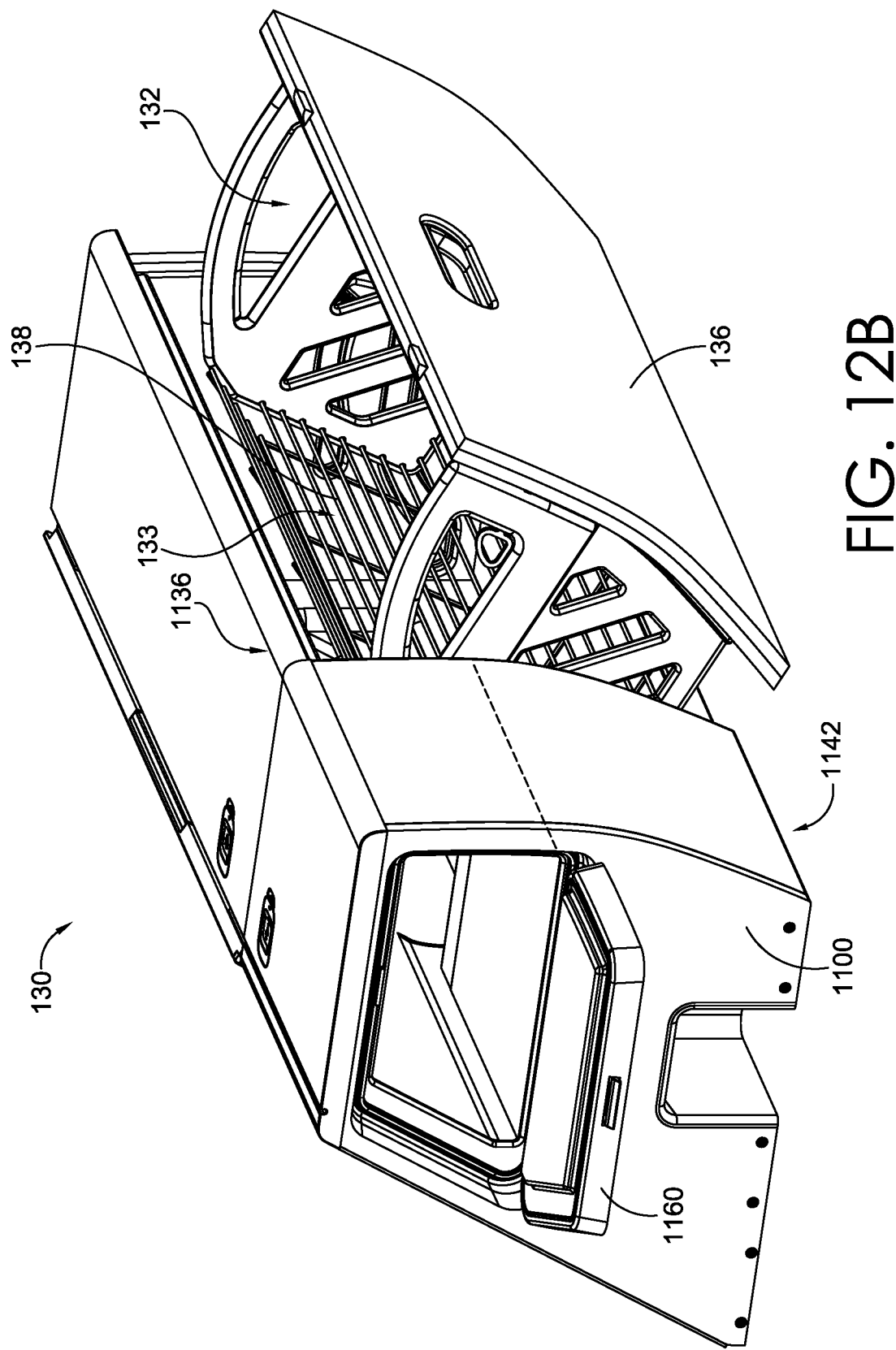
FIG. 12B is a schematic diagram of a left side of the refrigeration module having a second temperature-controlled storage unit that has been opened, in accordance with aspects of the technology described herein.

When the refrigeration module 130 is in the ejected state, the second temperature-controlled storage unit 1132 may be positioned on the proximal side of the vehicle 120 while the temperature-controlled storage unit 132 may be positioned on a distal side of the vehicle 120 (FIG. 1). In one embodiment, the lateral motion of the refrigeration module 130 may be restricted to the stopping point 1136. In this manner, the second temperature-controlled storage unit 1132 remains inside the tunnel 124 regardless of whether the refrigeration module is in the ejected state, retracted state, or transitioning there between. When the refrigeration module is in the retracted state, the second temperature-controlled storage unit 1132 may be accessible from the left side (e.g., driver side) of the vehicle 120, as illustrated in FIG. 12A.

The second temperature-controlled storage unit 1132 may provide additional temperature-controlled storage space that is accessible from a side of the vehicle different from the side of the vehicle 120 from which the temperature-controlled storage unit 132 is accessible. In one embodiment, the second temperature-controlled storage unit 1132 is controlled to the same temperature as the temperature-controlled storage unit 132. For example, a continuous chamber may be formed between the temperature-controlled storage unit 132 and second temperature-controlled storage unit 1132. In one embodiment, the second temperature-controlled storage unit 1132 serves as a freezer having a lower internal temperature, while the temperature-controlled storage unit 132 may serve as a fridge having a higher internal temperature.

In one embodiment, the temperature-controlled storage unit 132 is accessible from the second side 230 of the vehicle 120 (e.g., the passenger side) when the refrigeration module is in an ejected state. In one embodiment, the second temperature-controlled storage unit 1132 is accessible from the first side of the vehicle (e.g., the driver side).

The second temperature-controlled storage unit 1132 may be positioned on a first portion 1138 of the refrigeration module. The first portion 1138 may be positioned above a second portion 1142 of the refrigeration module. The first portion 1138 may be more proximal than the temperature-controlled storage unit 132. In one embodiment, the first portion 1138 and the second portion 1142 of the refrigeration module 130 may be separated from one another. The second portion 1142 may house refrigeration components 1144 that providing cooling. For example, the second portion 1142 may house a condenser, a compressor, an evaporator, an expansion valve, a sensor assembly, refrigerant fluid, refrigerant fluid lines, and the like. In one embodiment, the a condenser, a compressor, an evaporator, an expansion valve, a sensor assembly, refrigerant fluid, refrigerant fluid lines, and the like, are communicatively coupled to the control system 180 to achieve a target temperature within the temperature-controlled storage unit 132 second temperature-controlled storage unit 1132. Additionally, the control system 180 may be coupled to the actuator 150 as described above.

In one embodiment, the back surface 414 of the refrigeration module 130 may include an indention 1150 that may include a removable bowl 1152. The removable bowl 1152 may include a length and width of similar measurements to the indention 1150, such that the removable bowl 1152 may snap in and out of the indention 1150. The dashed lines on the illustrated embodiment shows the corners of the removable bowl 1152 that correspond to the corners of the indention 1150. In one embodiment, the back surface 414 may be flush when the removable bowl 1152 is snapped into the indention 1150. In one embodiment, the removable bowl 1152 may include an opening and may serve as a sink. It should be understood that the refrigeration module 130 may freely transition between the ejected and retracted state regardless of whether the removable bowl is snapped into the indention 1150 or not.

The second temperature-controlled storage unit 1132 may include a door 1160 that includes a latch 1162. The door 1160 may open in response to the latch 1162 being manually engaged. In one embodiment, the latch 1162 may be pulled to release a locking mechanism that allows the door 1160 to hinge open. The door 1160 may be accessible by opening a lid of the vehicle, as described herein.

The second temperature-controlled storage unit 1132 having the door 1160 open is illustrated in FIG. 12A. As illustrated, FIGS. 12A and 12B include respective schematic diagrams of a left side 1100 of the refrigeration module 130. FIG. 12A includes a left side 200 of a vehicle 120 having a refrigeration module 130 having a second temperature-controlled storage unit 1132 that has been opened, in accordance with aspects of the technology described herein. In one embodiment, the lid 309 of the tunnel 124 is opened to access the left side 1100 of the refrigeration module 130. Thereafter, the door 1160 may be opened by pulling on latch 1162 (FIG. 11) to disengage a locking mechanism. The door 1160 and/or the lid 309 may open by rotating in roll direction 304 about the longitudinal axis 204 from a vertical position to a position parallel to the ground.

FIGS. 13A, 13B, 13C, and 13D include respective schematic diagrams of a user interface/user experience device (UX/UI) 160 of the refrigeration module 130. The control system 180 may receive a sensor indication from the UX/UI indicative of a target temperature. In response to receiving the sensor indication, the control system 180 (FIG. 1) may cause the refrigeration components 1144 (FIG. 11) of the refrigeration module 130 (FIG. 1) to change the current temperature within the refrigeration module 130 (e.g., of the temperature-controlled storage unit 132) to the target temperature. Additionally or alternatively, the UX/UI 160 may receive a user input to cause the control system 180 to actuate the actuator 150 (FIG. 1) to cause the refrigeration module 130 to transition between the ejected state and the retracted state.

FIG. 13A includes an adjustable knob system 1310. The adjustable knob system 1310 may be turned to achieve a target temperature. For example, the adjustable knob system 1310 may include an adjustable knob 1312 with a visual indicator (e.g., arrow) and may include a visual indication of a range of temperatures 1314. The internal temperature of the temperature-controlled storage unit 132 may correspond to the temperature on the range of temperatures 1314 to which the adjustable knob 1312 is turned.

Figure 13C:
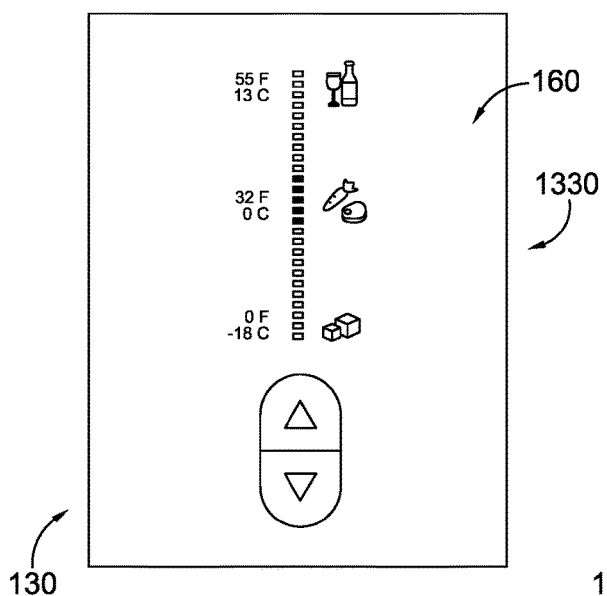
FIG. 13C is a schematic diagram of a UX/UI of the refrigeration module 130 that includes at least one button, in accordance with aspects of the technology described herein.
Figure 13D:
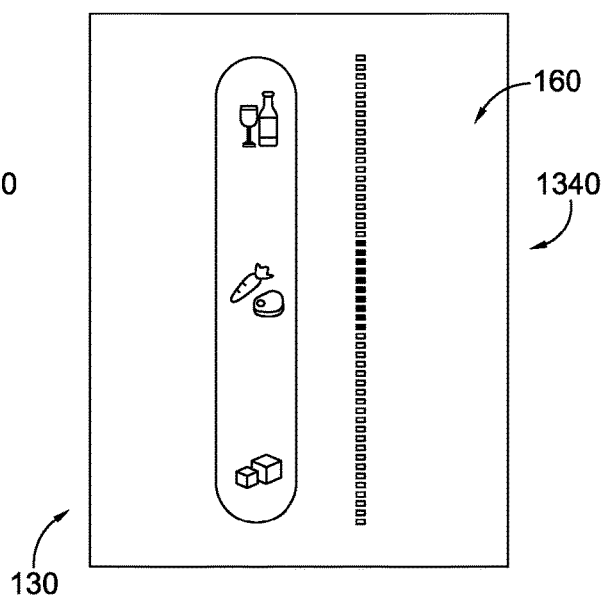
FIG. 13D is a schematic diagram of a UX/UI of the refrigeration module 130 that includes a linear touchscreen feature, in accordance with aspects of the technology described herein.

FIG. 13B includes a UX/UI 160 having a touch screen display 1320. The touch screen display 1320 includes a graphical user interface (GUI) 162 that may provide an indication of the current temperature of the refrigeration module 130 (e.g., within the temperature-controlled storage unit 132 (FIG. 1)) and/or the target temperature. The GUI 162 may receive user inputs (e.g., touch inputs) to cause the control system 180 to actuate refrigeration components 1144 (FIG. 11) to adjust the current temperature to the target temperature. FIG. 13C includes a UX/UI 160 having at least one depressible button 1330. The button 1330 may receive user inputs to cause the control system 180 to actuate refrigeration components 1144 to adjust the current temperature to the target temperature. FIG. 13D includes a UX/UI 160 having a linear touch screen feature 1340. A user may press and drag (vertically drag) on the linear touch screen feature 1340 to adjust a temperature of the refrigeration module.

Figure 14:
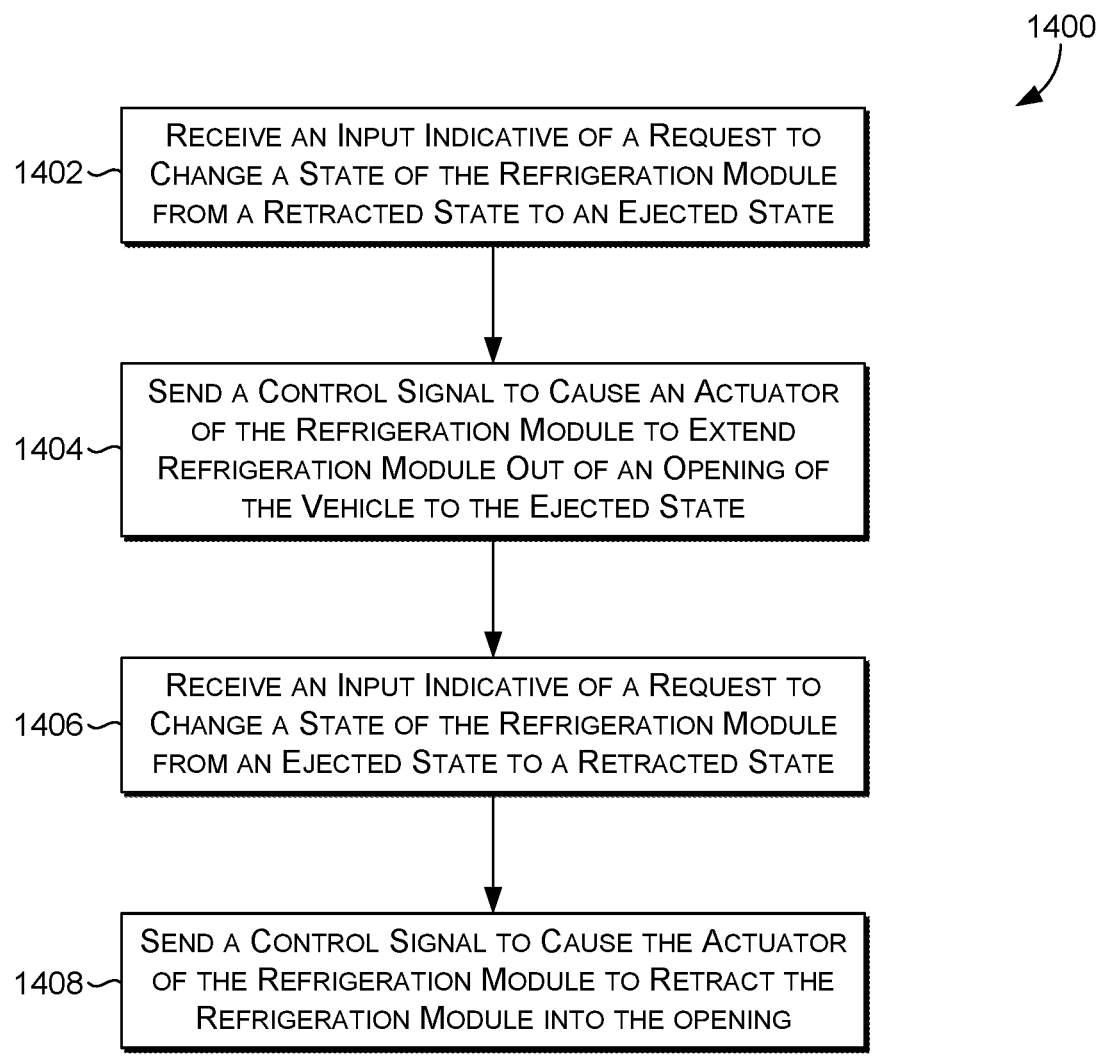
FIG. 14 is a flow diagram of an exemplary method for sending a control signal to actuate an actuator to cause a refrigeration module to transition between an ejected state and a retracted state, in accordance with aspects of the technology described herein.

FIG. 14 is a flow diagram of an exemplary method 1400 for sending a control signal to actuate an actuator 150 (FIG. 1) to cause a refrigeration module 130 (FIG. 1) to transition between an ejected state and a retracted state, in accordance with aspects of the technology described herein. It should be understood that process 1400 may be performed by any suitable device, such as the control system 180 (FIG. 1) or the hardware components illustrated in FIG. 16. Process 1400 includes receiving (block 1402) an input indicative of a request to change a state of the refrigeration module 130 from a retracted state to an ejected state. The input may be received via a display system 170 (FIG. 1) or UX/UI 160 (FIG. 1). In response to receiving the input, the process 1400 includes sending (block 1404) a control signal to cause the actuator 150 of the refrigeration module 130 to extend the refrigeration module 130 out of the tunnel 124 (FIG. 1) of the vehicle 120. Extending the refrigeration module 130 out of the tunnel 124 causes the refrigeration module 130 to transition from the retracted state to the ejected state.

Process 1400 includes receiving (block 1406) an input indicative of a request to change a state of the refrigeration module 130 from an ejected state to a retracted state. The input may be received via a display system 170 or UX/UI 160. In response to receiving the input, the process 1400 includes sending (block 1408) a control signal to cause the actuator 150 of the refrigeration module 130 to retract the refrigeration module 130 into the tunnel 124 of the vehicle 120. Retracting the refrigeration module 130 into the tunnel 124 causes the refrigeration module 130 to transition from the ejected state to the retracted state.

Figure 15:
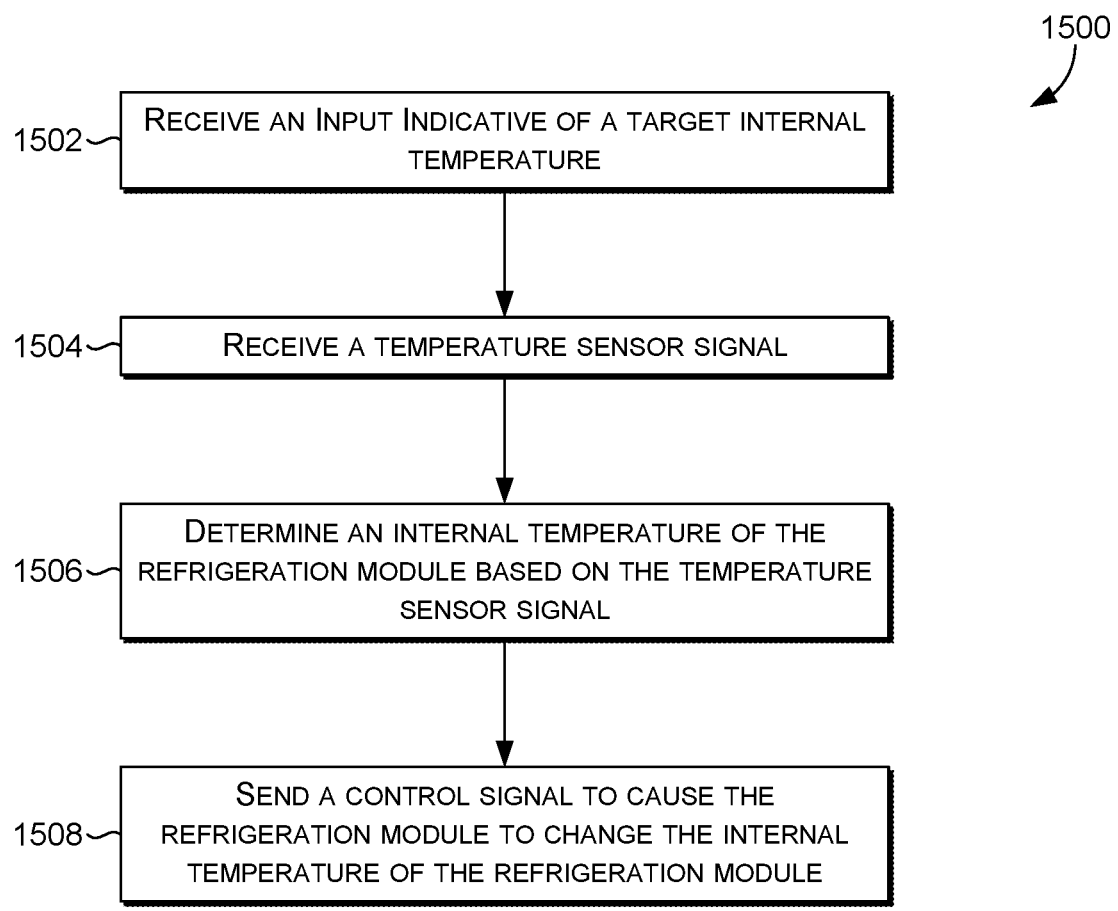
FIG. 15 is a flow diagram of an exemplary method for sending a control signal to control refrigeration components to achieve a target temperature within the refrigeration module, in accordance with aspects of the technology described herein.

FIG. 15 is a flow diagram of an exemplary method 1500 for sending a control signal to control refrigeration components 1144 (FIG. 11) to achieve a target temperature within the refrigeration module 130 (FIG. 1), in accordance with aspects of the technology described herein. Process 1500 includes receiving (block 1502) an input (e.g., a user input) via an interface of the vehicle. The input may be indicative of a target internal temperature of a refrigeration module 130. Additionally, process 1500 includes receiving (block 1504) a temperature sensor signal indicative of an internal temperature of the refrigeration module 130. The temperature sensor signal may be received from a thermostat or other sensor. Process 1500 incudes determining (1506) an internal temperature of the temperature-controlled storage unit 132 (FIG. 1) and/or the second temperature-controlled storage unit 1132 (FIG. 11) of the refrigeration module 130 based on the temperature sensor signal. Process 1500 includes sending (block 1508) a signal to cause the refrigeration module 130 to change the internal temperature of the refrigeration module 130 to the target internal temperature.

Figure 16:
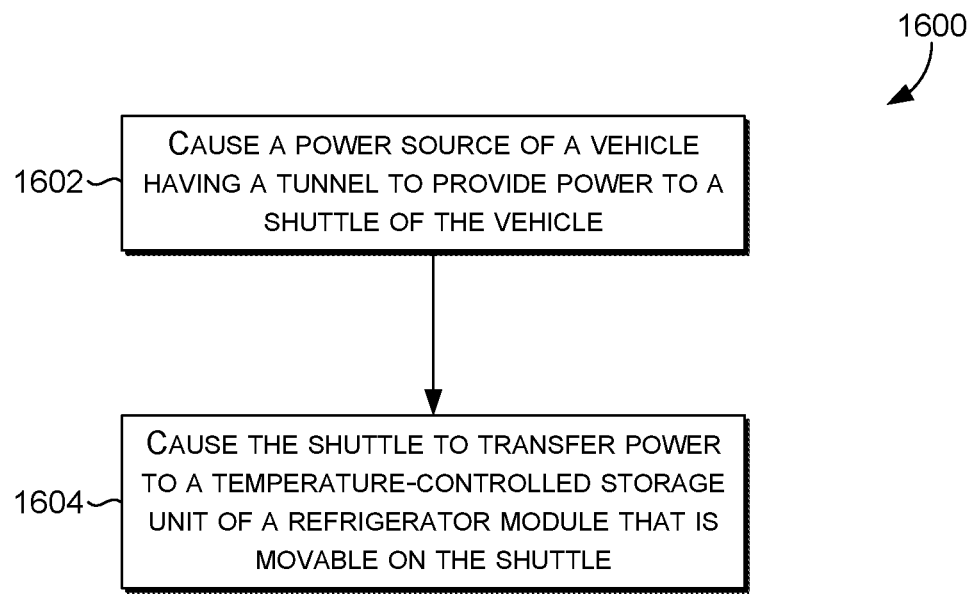
FIG. 16 is a flow diagram of an exemplary method for causing a shuttle to transfer power to a refrigeration module to achieve temperature control, in accordance with aspects of the technology described herein.

FIG. 16 is a flow diagram of an exemplary method for causing a shuttle 140 (FIG. 1) to transfer power to a refrigeration module 130 (FIG. 1) to achieve temperature control, in accordance with aspects of the technology described herein. Process 1600 includes causing (block 1602) a power source 122 (FIG. 1) of a vehicle 120 (FIG. 1) having a tunnel 124 (FIG. 1) to provide power to the shuttle 140 of the vehicle 120. Additionally, process 1600 includes causing (block 1604) the shuttle 140 to transfer power to a temperature-controlled storage unit 132 (FIG. 1) of the refrigeration module 130 that is movable on the shuttle 140. In one embodiment, transferring power to the temperature-controlled storage unit 132 provides temperature control to a temperature-controlled storage compartment 133.

Example Reduction to Practice

An illustrative example embodiment of the present disclosure that has been reduced to practice is described herein. This example embodiment comprises a vehicle 120 (FIGS.

1-4) having a refrigeration module 130 (FIGS. 1-4) ejectable with respect to the tunnel 124 (FIGS. 1-4), as described herein. Furthermore, this example embodiment includes a refrigeration module 130 having refrigeration components 1144 (FIG. 11) in the second portion 1142 (FIG. 11) of the refrigeration module 130, as described herein and as illustrated in FIG. 11. However, it should be noted that although this example reduction-to-practice focuses specifically on a specific implementation, embodiments of the technologies described herein are more generally applicable to a refrigeration module in any vehicle cavity, opening, or tunnel.

Figure 17:
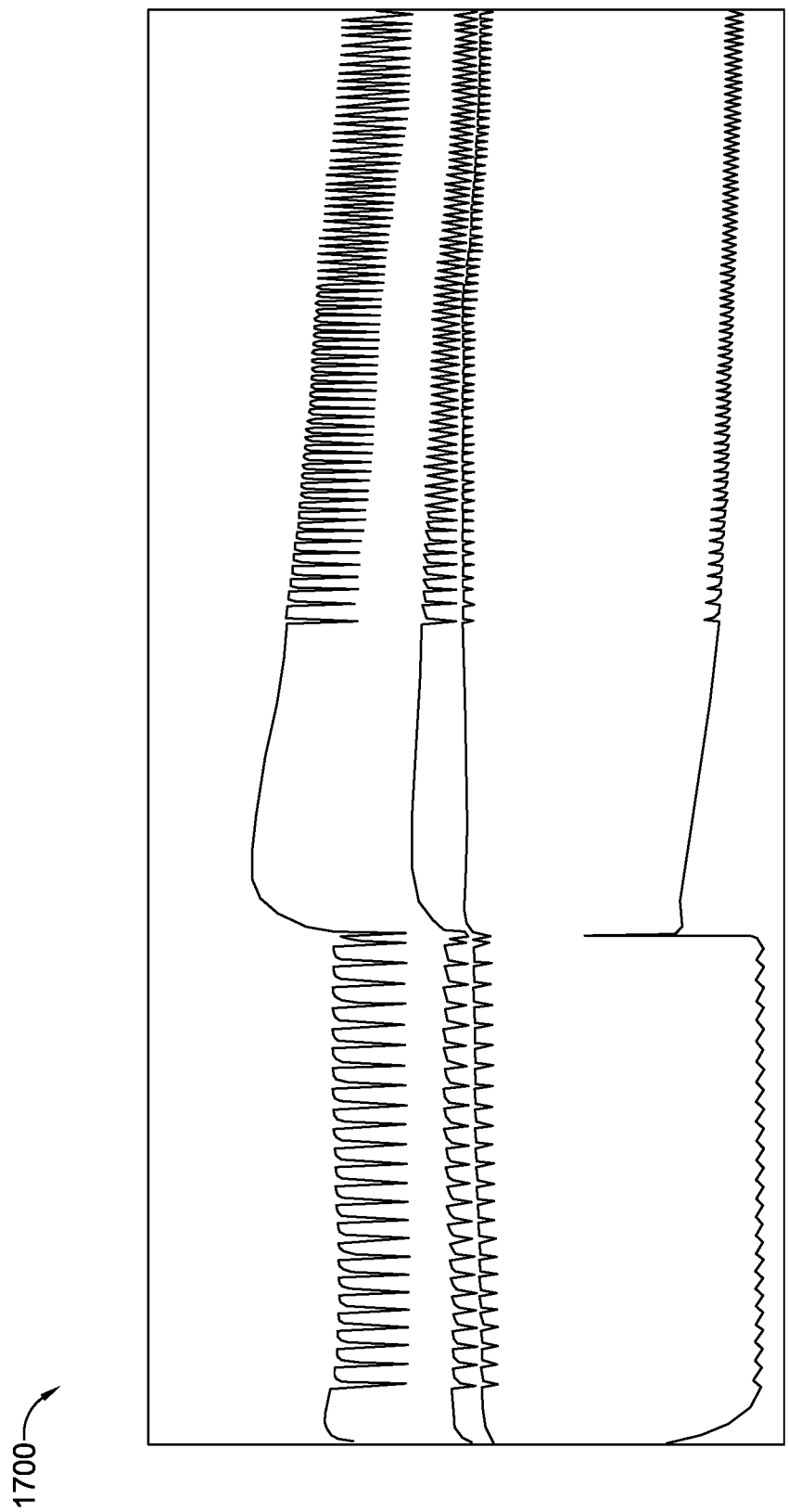
FIG. 17 is a graph diagram of testing results of an exemplary embodiment that was reduced to practice, in accordance with aspects of the technology described herein.

With reference to FIGS. 1-16, this example embodiment was constructed, tested, and verified as described below. FIG. 17 illustrates a log 1700 of temperatures from various positions associated with the vehicle 120 and the refrigeration module 130. In this example, performance of the refrigeration components 1144 located in the second portion 1142 was tested. During testing, discreet measurements from fourteen thermocouples were taken from the inside of the temperature-controlled storage unit 132, the first portion 1138 (FIG. 11), the second portion 1142, as well as within the tunnel 124 and external to the refrigeration module 130. The 12-V power was also logged. The test ran for 28 hours starting with an empty temperature-controlled storage unit 132. Items, such as groceries were added to the temperature-controlled storage unit 132 to investigate how the power consumption changed, compressor outlet temperature changed, and the refrigeration module reacted. Through this and other studies, it was discovered that (1) the compressor temperature was easily managed, (2) the temperature cut off threshold was not reached, and (3) the cabin conditions did not change during operation of the refrigeration module 130. Therefore, the refrigeration module 130 successfully performed in the ejected state and the retracted state while the drawer transitioned between the opened state and the closed state.

Example Electric Vehicle System

Figure 18:
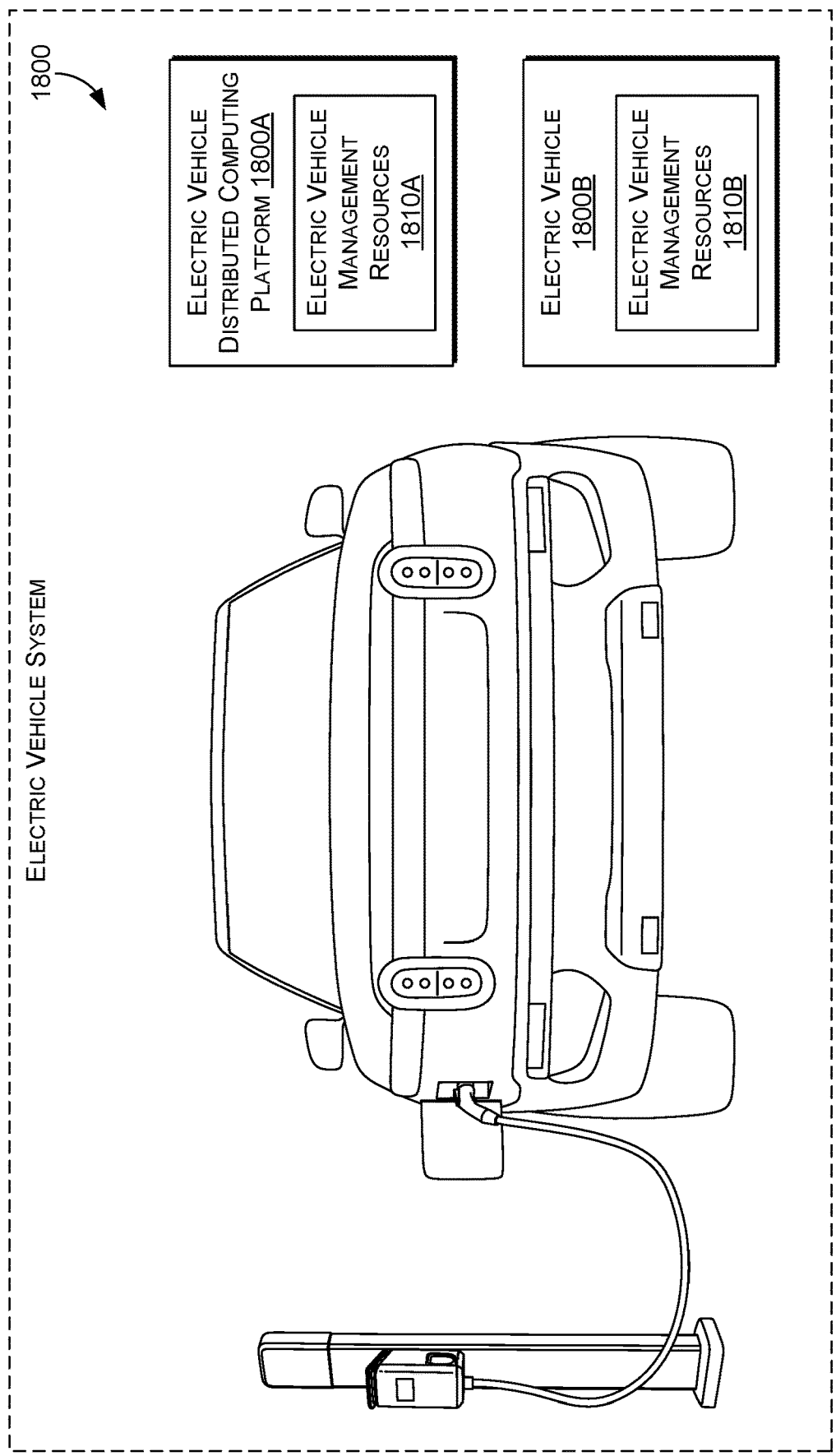
FIG. 18 is a schematic diagram of an example electric vehicle system, in accordance with aspects of the technology described herein.

With reference to FIG. 18, FIG. 18 illustrates an example electric vehicle system 1800 in which implementations of the present disclosure may be employed. In particular, FIG. 18 shows a high level architecture of an example electric vehicle distributed computing platform 1800A and electric vehicle 1800B having electric vehicle management resources 1810A and electric vehicle management resources 1810B, respectively, that support the functionality described herein. The electric vehicle system 1800 can host a technical solution environment, or a portion thereof.

The electric vehicle distributed computing platform 1800A includes electric vehicle management resources 1810A that provide and support electric vehicle distributed computing systems and operations. Electric vehicle distributed computing platform 1800A can run cloud services across different data centers and geographic regions. Typically the electric vehicle distributed computing platform 1800A acts to store data or run service applications in a distributed manner. For example, a service application can be supported a computing environment (e.g., host, node, and virtual machine) and resources (e.g., hardware resources and software resources) that are configured the service application; and a client device may be linked to a service application and configured to issue commands to the service application. Communications in the electric vehicle distributed computing platform 1800A are performed through a virtual Internet Protocol (IP) and over a network (not shown), which may include, without limitation, one or more local area networks (LANs) and/or wide area networks (WANs).

The electric vehicle 1800B includes electric vehicle management resources 1810B that provide and support electric vehicle systems and operations. Electric vehicle 1800B can refer to a vehicle that uses electric power. The electric vehicle 1800B can be built on a configuration for an automotive chassis used for automotive platforms of battery electric vehicles. The configuration can include a base structure that houses the batteries, electric motors, and other electronic components of the electric vehicle. By way of example, the electric vehicle can include a steering system, brake sensor system, and controller systems.

Controllers can include one or more systems on chips (SoCs) that may provide signals to one or more components and systems of the vehicle. For example, controllers can support a steering system, braking system, one or more onboard computing devices, artificial intelligence functionality (e.g., computer vision), infotainment functionality, global navigation satellite systems and sensors (e.g., Global Positioning System sensors, RADAR sensors, LIDAR sensors) and inertial measurement unit (IMU) sensors (e.g., accelerometers, gyroscopes). Controllers may receive inputs (e.g., represented by input data) from and provide outputs (e.g., represented by output data, display data, etc.) via a human-machine interface (HMI) display @ 134 and other components of the electric vehicle.

The electric vehicle further includes a network interface which may use one or more wireless antenna(s) and/or modem(s) to communicate over one or more networks. For example, the network interface may be capable of communication over LTE, WCDMA, UMTS, GSM, CDMA2000, etc. The wireless antenna(s) @ 126 may also enable communication between objects in the environment (e.g., vehicles, mobile devices, etc.), using local area network(s), such as Bluetooth, Bluetooth LE, Z-Wave, ZigBee, etc., and/or low power wide-area network(s) (LPWANs), such as LoRaWAN, SigFox, etc.

It should be understood that this and other arrangements described herein are set forth as examples. For example, as described above, many elements described herein may be implemented as discrete or distributed components or in conjunction with other components, and in any suitable combination and location. Other arrangements and elements (e.g., machines, interfaces, functions, orders, and groupings of functions) can be used in addition to or instead of those shown. The various blocks are shown with lines for the sake of conceptual clarity, and other arrangements of the described components and/or component functionality are also contemplated. FIG. 18 is merely meant to illustrative of an example electric vehicle and electric vehicle system that can be used in connection with one or more embodiments of the present invention.

Example Computing Environment

Having briefly described an overview of embodiments of the present invention, an example operating environment in which embodiments of the present invention may be implemented is described below in order to provide a general context for various aspects of the present invention. Referring initially to FIG. 7 in particular, an example operating environment for implementing embodiments of the present invention is shown and designated generally as computing device 700. Computing device 700 is but one example of a suitable computing environment and is not intended to suggest any limitation as to the scope of use or functionality of the invention. Neither should computing device 700 be interpreted as having any dependency or requirement relating to any one or combination of components illustrated.

The invention may be described in the general context of computer code or machine-useable instructions, including computer-executable instructions such as program modules, being executed by a computer or other machine, such as a personal data assistant or other handheld device. Generally, program modules including routines, programs, objects, components, data structures, etc. refer to code that perform particular tasks or implement particular abstract data types. The invention may be practiced in a variety of system configurations, including hand-held devices, consumer electronics, general-purpose computers, more specialty computing devices, etc. The invention may also be practiced in distributed computing environments where tasks are performed by remote-processing devices that are linked through a communications network.

Figure 19:
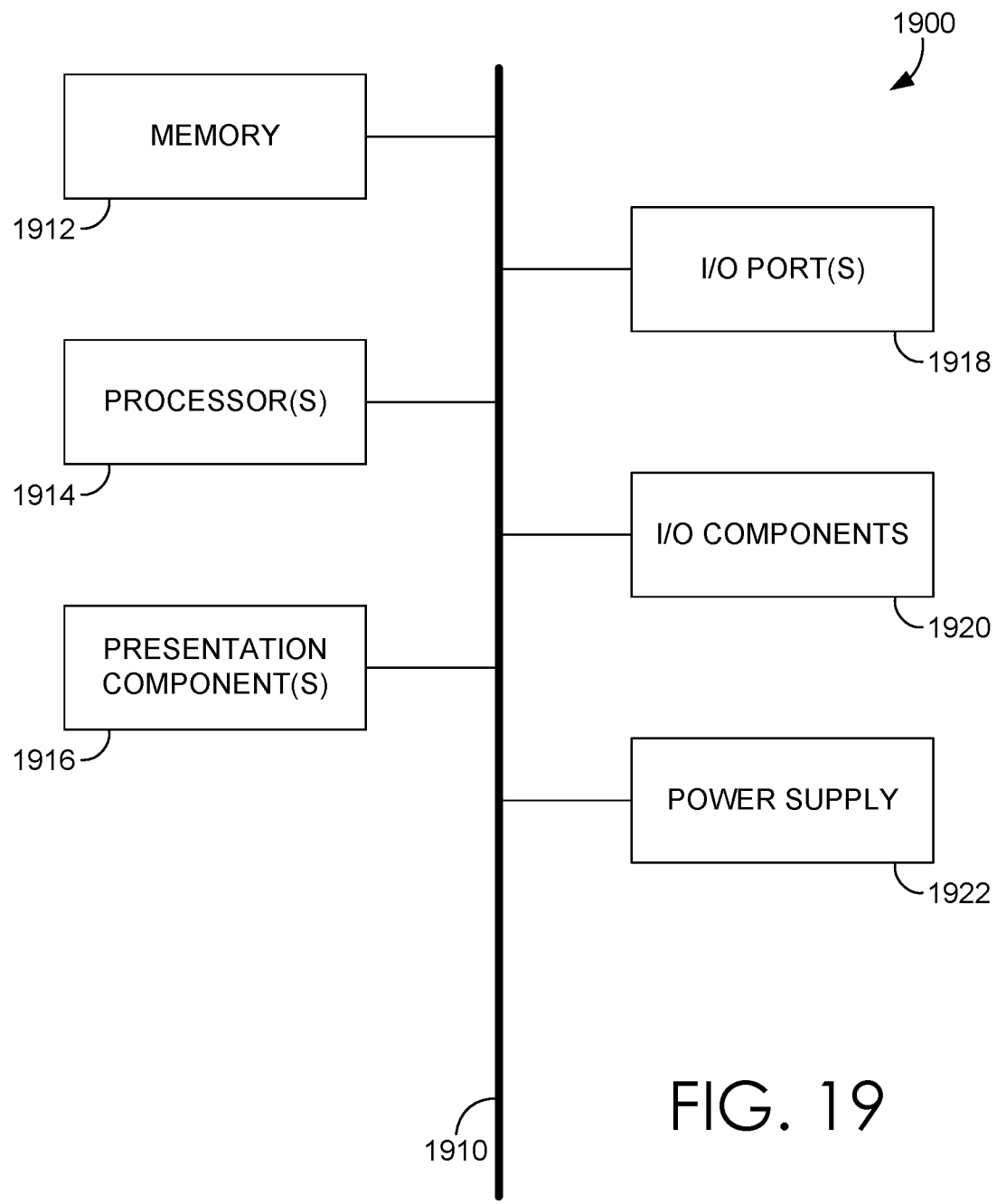
FIG. 19 is a block diagram of an exemplary computing environment suitable for use in implementing aspects of the technology described herein.

With reference to FIG. 19, computing device 1900 includes bus 1910 that directly or indirectly couples the following devices: memory 1912, one or more processors 1914, one or more presentation components 1916, input/output ports 1918, input/output components 1920, and illustrative power supply 1922. Bus 1910 represents what may be one or more buses (such as an address bus, data bus, or combination thereof). The various blocks of FIG. 19 are shown with lines for the sake of conceptual clarity, and other arrangements of the described components and/or component functionality are also contemplated. For example, one may consider a presentation component such as a display device to be an I/O component. Also, processors have memory. We recognize that such is the nature of the art, and reiterate that the diagram of FIG. 19 is merely illustrative of an example computing device that can be used in connection with one or more embodiments of the present invention. Distinction is not made between such categories as "workstation," "server," "laptop," "hand-held device," etc., as all are contemplated within the scope of FIG. 19 and reference to "computing device."

Computing device 1900 typically includes a variety of computer-readable media. Computer-readable media can be any available media that can be accessed by computing device 1900 and includes both volatile and nonvolatile media, removable and non-removable media. By way of example, and not limitation, computer-readable media may comprise computer storage media and communication media.

Computer storage media include volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 1900. Computer storage media excludes signals per se.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 1912 includes computer storage media in the form of volatile and/or nonvolatile memory. The memory may be removable, non-removable, or a combination thereof. Exemplary hardware devices include solid-state memory, hard drives, optical-disc drives, etc. Computing device 1900 includes one or more processors that read data from various entities such as memory 1912 or I/O components 1920. Presentation component(s) 1916 present data indications to a user or other device. Exemplary presentation components include a display device, speaker, printing component, vibrating component, etc.

I/O ports 1918 allow computing device 1900 to be logically coupled to other devices including I/O components 1920, some of which may be built in. Illustrative components include a microphone, joystick, game pad, satellite dish, scanner, printer, wireless device, etc.

Additional Structural and Functional Features of Embodiments of the Technical Solution Having identified various components utilized herein, it should be understood that any number of components and arrangements may be employed to achieve the desired functionality within the scope of the present disclosure. For example, the components in the embodiments depicted in the figures are shown with lines for the sake of conceptual clarity. Other arrangements of these and other components may also be implemented. For example, although some components are depicted as single components, many of the elements described herein may be implemented as discrete or distributed components or in conjunction with other components, and in any suitable combination and location. Some elements may be omitted altogether. Moreover, various functions described herein as being performed by one or more entities may be carried out by hardware, firmware, and/or software, as described below. For instance, various functions may be carried out by a processor executing instructions stored in memory. As such, other arrangements and elements (e.g., machines, interfaces, functions, orders, and groupings of functions) can be used in addition to or instead of those shown.

Embodiments described in the paragraphs below may be combined with one or more of the specifically described alternatives. In particular, an embodiment that is claimed may contain a reference, in the alternative, to more than one other embodiment. The embodiment that is claimed may specify a further limitation of the subject matter claimed.

The subject matter of embodiments of the invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

For purposes of this disclosure, the word "including" has the same broad meaning as the word "comprising," and the word "accessing" comprises "receiving," "referencing," or "retrieving." Further the word "communicating" has the same broad meaning as the word "receiving," or "transmitting" facilitated by software or hardware-based buses, receivers, or transmitters using communication media described herein. In addition, words such as "a" and "an," unless otherwise indicated to the contrary, include the plural as well as the singular. Thus, for example, the constraint of "a feature" is satisfied where one or more features are present. Also, the term "or" includes the conjunctive, the disjunctive, and both (a or b thus includes either a or b, as well as a and b).

For purposes of a detailed discussion above, embodiments of the present invention are described with reference to a distributed computing environment; however the distributed computing environment depicted herein is merely exemplary. Components can be configured for performing novel aspects of embodiments, where the term "configured for" can refer to "programmed to" perform particular tasks or implement particular abstract data types using code. Further, while embodiments of the present invention may generally refer to the technical solution environment and the schematics described herein, it is understood that the techniques described may be extended to other implementation contexts.

Embodiments of the present invention have been described in relation to particular embodiments which are intended in all respects to be illustrative rather than restrictive. Alternative embodiments will become apparent to those of ordinary skill in the art to which the present invention pertains without departing from its scope.

From the foregoing, it will be seen that this invention is one well adapted to attain all the ends and objects hereinabove set forth together with other advantages which are obvious and which are inherent to the structure.

It will be understood that certain features and sub-combinations are of utility and may be employed without reference to other features or sub-combinations. This is contemplated by and is within the scope of the claims.

What is claimed is:

1. A system, comprising:
   a tunnel extending from a first side of a vehicle to a second side of the vehicle; and
   a refrigeration module movable on a shuttle of the tunnel, wherein the refrigeration module comprises a temperature-controlled storage unit configured to receive power from the shuttle.

2. The system of claim 1, wherein the shuttle is configured to transfer the power using a power source of the vehicle, and wherein the refrigeration module controls a temperature of the temperature-controlled storage unit based on the power transferred.

3. The system of claim 1, wherein the refrigeration module comprises a door on the first side of the vehicle, and wherein the door is openable to provide access to the temperature-controlled storage unit while the refrigeration module is positioned inside the tunnel.

4. The system of claim 1, wherein the temperature-controlled storage unit comprises side walls and corner regions that conform to the tunnel, such that a lateral cross sectional shape of the temperature-controlled storage unit substantially matches a lateral cross sectional shape of the tunnel.

5. The system of claim 1, wherein the temperature-controlled storage unit is removable from the shuttle.

6. The system of claim 1, wherein the shuttle is extensible to allow the refrigeration module to slide in and out of the tunnel, and wherein the shuttle is selectively compressible to allow the refrigeration module to slide into the tunnel.

7. The system of claim 1, wherein at least one of the refrigeration module or the shuttle is connected to a power source of the vehicle, wherein the power source provides the power to the refrigeration module when the vehicle is powered on or off, wherein the power source corresponds to a 12-volt battery.

8. The system of claim 1, the vehicle comprising:
   a first lid, on the first side of the vehicle, openable to provide access to the tunnel; and
   a second lid, on the second side of the vehicle, openable to provide access to the tunnel.

9. The system of claim 1, wherein the refrigeration module is configured to slide in and out of the tunnel at the second side and not the first side.

10. The system of claim 1, comprising a control system comprising:
    one or more computer processors; and
    computer memory storing computer-readable instructions that, when used by the one or more computer processors, cause the one or more computer processors to perform operations comprising:
    receiving a user input from an interface of the vehicle or from a mobile device, the user input indicates a target internal temperature of the refrigeration module, the interface comprising at least one of a display configured to present a graphical user interface, an adjustable knob, a button, or a switch;
    receiving a temperature sensor signal;
    determining an internal temperature of the refrigeration module based on the temperature sensor signal; and
    sending a control signal to a refrigeration component to cause the refrigeration module to change the internal temperature of the refrigeration module to the target internal temperature based on the user input.

11. The system of claim 1, wherein the refrigeration module is movable on the shuttle along a lateral axis substantially perpendicular with respect to a direction of travel of the vehicle, wherein the refrigeration module is configured to slide in and out of the tunnel along the lateral axis.

12. A refrigeration module for a vehicle, the refrigeration module comprising:
    a temperature-controlled storage unit comprising a power interface configured to receive power from a shuttle that is movable in and out of a tunnel extending into the vehicle; and
    a latching interface configured to lock the temperature-controlled storage unit to a fixed position on the shuttle, and wherein the temperature-controlled storage unit is configured to open or close to respectively provide or restrict access to a temperature-controlled storage compartment.

13. The refrigeration module of claim 12, wherein the temperature-controlled storage unit comprises side walls and corner regions that conform to the tunnel, such that a lateral cross sectional shape of the storage compartment substantially matches a lateral cross sectional shape of the tunnel.

14. The refrigeration module of claim 13, wherein the temperature-controlled storage unit comprises a drawer comprising a first and second roller corresponding to a first and second roller path, respectively, positioned on at least one side wall of the side walls of the temperature-controlled storage unit, wherein the first roller path comprises a vertically extending lip portion at an inlet to the first roller path, and wherein the drawer is removable from the temperature-controlled storage unit by causing the first roller to contact the lip portion and then the drawer being vertically displaced.

15. The refrigeration module of claim 12, wherein the tunnel extends into the vehicle between a first side and a second side of the vehicle, wherein the refrigeration module is configured to slide in and out of the tunnel at the second side and not at the first side, wherein the first side corresponds to a driver side of the vehicle, wherein the second side corresponds to a passenger side of the vehicle.

16. The refrigeration module of claim 12, wherein the refrigeration module is connected to a power source of the vehicle, wherein the power source provides power to the refrigeration module when the vehicle is powered on or off, wherein the power source is a low-voltage battery separate from a high-voltage battery powering the vehicle.

17. The refrigeration module of claim 12, comprising a control system comprising:
  one or more computer processors; and
  computer memory storing computer-readable instructions that, when used by the one or more computer processors, cause the one or more computer processors to perform operations comprising:
  receiving a user input via an interface of the vehicle, the user input being indicative of a target internal temperature of the temperature-controlled storage unit;
  receive a temperature sensor signal;
  determine an internal temperature of the temperature-controlled storage unit based on the temperature sensor signal; and
  send a control signal to a refrigeration component to cause the refrigeration module to change the internal temperature to the target internal temperature.

18. A method, comprising:
  causing a power source of a vehicle having a tunnel to provide power to a shuttle of the vehicle, wherein the tunnel extends from a first side of the vehicle to a second side of the vehicle; and
  causing the shuttle to transfer power to a temperature-controlled storage unit of a refrigeration module that is movable on the shuttle.

19. The method of claim 18, further comprising:
  receiving a user input indicative of a target internal temperature for the refrigeration module, wherein the power transfer causes the refrigeration module to change an internal temperature of the refrigeration module to the target internal temperature.

20. The method of claim 19, wherein the user input is received via an interface of the vehicle when the refrigeration module is in an ejected state, and wherein the refrigeration module is in the ejected state when the refrigeration module extends out of the tunnel of the vehicle.

* * * * *